United States Patent
Sung et al.

(10) Patent No.: US 11,592,859 B2
(45) Date of Patent: Feb. 28, 2023

(54) GATE CLOCK GENERATOR AND DISPLAY DEVICE

(71) Applicant: SAMSUNG DISPLAY CO., LTD., Yongin-si (KR)

(72) Inventors: Siduk Sung, Hwaseong-si (KR); Dae-Sik Lee, Hwaseong-si (KR); Sanghyun Lee, Seongnam-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/206,784

(22) Filed: Mar. 19, 2021

(65) Prior Publication Data

US 2022/0019256 A1     Jan. 20, 2022

(30) Foreign Application Priority Data

Jul. 14, 2020   (KR) ........................ 10-2020-0086832

(51) Int. Cl.
    *G06F 1/08*         (2006.01)
    *G09G 3/20*         (2006.01)
    *G06F 1/10*         (2006.01)

(52) U.S. Cl.
    CPC .................. *G06F 1/08* (2013.01); *G06F 1/10* (2013.01); *G09G 3/20* (2013.01); *G09G 2310/08* (2013.01); *G09G 2330/028* (2013.01)

(58) Field of Classification Search
    CPC .... G06F 1/08; G06F 1/10; G09G 3/20; G09G 2310/08; G09G 2330/028
    See application file for complete search history.

(56) References Cited

U.S. PATENT DOCUMENTS

2021/0043717 A1*   2/2021   Park .................... H01L 27/3279

FOREIGN PATENT DOCUMENTS

KR    10-2017-0087086      7/2017

* cited by examiner

*Primary Examiner* — Kenneth B Lee, Jr.
(74) *Attorney, Agent, or Firm* — F. Chau & Associates, LLC

(57) ABSTRACT

A gate clock generator of a display device includes a carry clock generator configured to sequentially generate N carry clock signals based on a carry-on clock signal and a carry-off clock signal, a scan clock generator configured to generate N scan clock signals based on a scan-on clock signal and a scan-off clock signal, and a sensing clock generator configured to generate N sensing clock signals based on a sensing-on clock signal and a sensing-off clock signal. In a multi-clock mode of the display device, during an on period of a K-th carry clock signal, the scan clock generator outputs a K-th scan clock signal such that the K-th scan clock signal has a number of pulses that corresponds to a number of pulses of the scan-on clock signal in the on period of the K-th carry clock signal, and the sensing clock generator outputs a K-th sensing clock signal such that the K-th sensing clock signal has a number of pulses that corresponds to a number of pulses of the sensing-on clock signal in the on period of the K-th carry clock signal.

20 Claims, 11 Drawing Sheets

GATE CLOCK GENERATOR AND DISPLAY DEVICE

CROSS-REFERENCE TO RELATED APPLICATION(S)

This application claims priority under 35 USC § 119 to Korean Patent Application No. 10-2020-0086832, filed on Jul. 14, 2020 in the Korean Intellectual Property Office (KIPO), the disclosure of which is incorporated by reference in its entirety.

FIELD

The present disclosure relates to display devices, and more particularly to a gate clock generator that generates gate clock signals for a gate driver, and a display device including the gate clock generator.

DISCUSSION OF RELATED ART

A gate clock generator of a display device may receive gate clock signals, such as carry clock signals, scan clock signals and sensing clock signals, from a controller of the display device, may adjust voltage levels of the gate clock signals to voltage levels suitable for a gate driver of the display device, and may provide the gate clock signals having suitable voltage levels to the gate driver. The gate driver may provide scan signals and sensing signals to a plurality of pixels of the display device based on the gate clock signals.

SUMMARY

Some embodiments may provide a gate clock generator that supports a multi-clock mode of a display device, where the number of pulses per period of each gate clock signal is variable and may be greater than a predefined number such as four.

Some embodiments may provide a display device including a gate clock generator that supports a multi-clock mode of a display device, where the number of pulses per period of each gate clock signal is variable and may be greater than a predefined number such as four.

According to an embodiment, a gate clock generator of a display device is provided, including a carry clock generator configured to sequentially generate N carry clock signals based on a carry on clock signal and a carry-off clock signal, where N is an integer greater than 1, a scan clock generator configured to generate N scan clock signals based on a scan-on clock signal and a scan-off clock signal, and a sensing clock generator configured to generate N sensing clock signals based on a sensing-on clock signal and a sensing-off clock signal. In a multi-clock mode of the display device, during an on period of a K-th carry clock signal of the N carry clock signals, where K is an integer greater than 0 and less than or equal to N, the scan clock generator outputs a K-th scan clock signal of the N scan clock signals such that the K-th scan clock signal has a number of pulses that corresponds to a number of pulses of the scan-on clock signal in the on period of the K-th carry clock signal, and the sensing clock generator outputs a K-th sensing clock signal of the N sensing clock signals such that the K-th sensing clock signal has a number of pulses that corresponds to a number of pulses of the sensing-on clock signal in the on period of the K-th carry clock signal.

In an embodiment, in the multi-clock mode, the carry clock generator may provide the N carry clock signals to the scan clock generator and the sensing clock generator.

In an embodiment, in the multi-clock mode, during the on period of the K-th carry clock signal, the scan clock generator may change the K-th scan clock signal to an on level in response to each pulse of the scan-on clock signal, and may change the K-th scan clock signal to an off level in response to each pulse of the scan-off clock signal. In the multi-clock mode, during the on period of the K-th carry clock signal, the sensing clock generator may change the K-th sensing clock signal to the on level in response to each pulse of the sensing-on clock signal, and may change the K-th sensing clock signal to the off level in response to each pulse of the sensing-off clock signal.

In an embodiment, the carry clock generator may include a carry mode selection block configured to determine an operation mode of the gate clock generator, and to generate a mode signal representing the operation mode, a carry pulse generator block configured to sequentially generate the N carry clock signals based on the carry-on clock signal and the carry-off clock signal, and to provide the N carry clock signals to the scan clock generator and the sensing clock generator in response to the mode signal indicating the multi-clock mode, and a carry level shifter block configured to adjust voltage levels of the N carry clock signals to voltage levels suitable for a gate driver, and to provide the N carry clock signals to the gate driver.

In an embodiment, the scan clock generator may include a scan mode selection block configured to determine an operation mode of the gate clock generator, and to generate a mode signal representing the operation mode, a scan pulse generator block configured to generate the N scan clock signals based on the N carry clock signals, the scan-on clock signal and the scan-off clock signal in response to the mode signal indicating the multi-clock mode, and to generate the N scan clock signals based on the scan-on clock signal and the scan-off clock signal in response to the mode signal indicating an operation mode other than the multi-clock mode, and a scan level shifter block configured to adjust voltage levels of the N scan clock signals to voltage levels suitable for a gate driver, and to provide the N scan clock signals to the gate driver.

In an embodiment, the sensing clock generator may include a sensing mode selection block configured to determine an operation mode of the gate clock generator, and to generate a mode signal representing the operation mode, a sensing pulse generator block configured to generate the N sensing clock signals based on the N carry clock signals, the sensing-on clock signal and the sensing-off clock signal in response to the mode signal indicating the multi-clock mode, and to generate the N sensing clock signals based on the sensing-on clock signal and the sensing-off clock signal in response to the mode signal indicating the operation mode other than the multi-clock mode, and a sensing level shifter block configured to adjust voltage levels of the N sensing clock signals to voltage levels suitable for a gate driver, and to provide the N scan clock signals to the gate driver.

In an embodiment, in the multi-clock mode, the carry clock generator may provide a multi sensing enable signal to the scan clock generator and the sensing clock generator.

In an embodiment, in the multi-clock mode, during a first on period of the multi sensing enable signal, the scan clock generator may change a first scan clock signal of the N scan clock signals to an on level in response to each pulse of the scan-on clock signal, and may change the first scan clock signal to an off level in response to each pulse of the scan-off clock signal. In the multi-clock mode, during a second on period of the multi sensing enable signal, the scan clock generator may change a second scan clock signal of the N scan clock signals to the on level in response to each pulse of the scan-on clock signal, and may change the second scan clock signal to the off level in response to each pulse of the scan-off clock signal. In the multi-clock mode, during the first on period of the multi sensing enable signal, the sensing clock generator may change a first sensing clock signal of the N sensing clock signals to the on level in response to each pulse of the sensing-on clock signal, and may change the first sensing clock signal to the off level in response to each pulse of the sensing-off clock signal. In the multi-clock mode, during the second on period of the multi sensing enable signal, the sensing clock generator may change a second sensing clock signal of the N sensing clock signals to the on level in response to each pulse of the sensing-on clock signal, and may change the second sensing clock signal to the off level in response to each pulse of the sensing-off clock signal.

In an embodiment, the carry clock generator may include a carry mode selection block configured to determine an operation mode of the gate clock generator, and to generate a mode signal representing the operation mode, a carry pulse generator block configured to sequentially generate the N carry clock signals based on the carry-on clock signal and the carry-off clock signal, and to generate a multi sensing enable signal in response to the mode signal indicating the multi-clock mode, the multi sensing enable signal having an on period when at least one of the N carry clock signals has an on period, and a carry level shifter block configured to adjust voltage levels of the N carry clock signals to voltage levels suitable for a gate driver, and to provide the N carry clock signals to the gate driver.

In an embodiment, the scan clock generator may include a scan mode selection block configured to determine an operation mode of the gate clock generator, and to generate a mode signal representing the operation mode, a scan pulse generator block configured to generate the N scan clock signals based on a multi sensing enable signal received from the carry clock generator, the scan-on clock signal and the scan-off clock signal in response to the mode signal indicating the multi-clock mode, and to generate the N scan clock signals based on the scan-on clock signal and the scan-off clock signal in response to the mode signal indicating the operation mode other than the multi-clock mode, and a scan level shifter block configured to adjust voltage levels of the N scan clock signals to voltage levels suitable for a gate driver, and to provide the N scan clock signals to the gate driver.

In an embodiment, the sensing clock generator may include a sensing mode selection block configured to determine an operation mode of the gate clock generator, and to generate a mode signal representing the operation mode, a sensing pulse generator block configured to generate the N sensing clock signals based on a multi sensing enable signal received from the carry clock generator, the sensing-on clock signal and the sensing-off clock signal in response to the mode signal indicating the multi-clock mode, and to generate the N sensing clock signals based on the sensing-on clock signal and the sensing-off clock signal in response to the mode signal indicating the operation mode other than the multi-clock mode, and a sensing level shifter block configured to adjust voltage levels of the N sensing clock signals to voltage levels suitable for a gate driver, and to provide the N scan clock signals to the gate driver.

According to an embodiment, there is provided a gate clock generator of a display device including a carry clock generator configured to receive a carry-on clock signal, a carry-off clock signal from a controller of the display device, and to sequentially generate N carry clock signals based on the carry-on clock signal and the carry-off clock signal, where N is an integer greater than 1, a scan clock generator configured to receive a multi sensing enable signal, a scan-on clock signal and a scan-off clock signal from the controller, to generate N scan clock signals based on the multi sensing enable signal, the scan-on clock signal and the scan-off clock signal in a multi-clock mode of the display device, and to generate the N scan clock signals based on the scan-on clock signal and the scan-off clock signal in an operation mode other than the multi-clock mode, and a sensing clock generator configured to receive the multi sensing enable signal, a sensing-on clock signal and a sensing-off clock signal from the controller, to generate N sensing clock signals based on the multi sensing enable signal, the sensing-on clock signal and the sensing-off clock signal in the multi-clock mode, and to generate the N sensing clock signals based on the sensing-on clock signal and the sensing-off clock signal in the operation mode other than the multi-clock mode.

In an embodiment, in the multi-clock mode, during a first on period of the multi sensing enable signal, the scan clock generator may change a first scan clock signal of the N scan clock signals to an on level in response to each pulse of the scan-on clock signal, and may change the first scan clock signal to an off level in response to each pulse of the scan-off clock signal. In the multi-clock mode, during a second on period of the multi sensing enable signal, the scan clock generator may change a second scan clock signal of the N scan clock signals to the on level in response to each pulse of the scan-on clock signal, and may change the second scan clock signal to the off level in response to each pulse of the scan-off clock signal. In the multi-clock mode, during the first on period of the multi sensing enable signal, the sensing clock generator may change a first sensing clock signal of the N sensing clock signals to the on level in response to each pulse of the sensing-on clock signal, and may change the first sensing clock signal to the off level in response to each pulse of the sensing-off clock signal. In the multi-clock mode, during the second on period of the multi sensing enable signal, the sensing clock generator may change a second sensing clock signal of the N sensing clock signals to the on level in response to each pulse of the sensing-on clock signal, and may change the second sensing clock signal to the off level in response to each pulse of the sensing-off clock signal.

In an embodiment, the scan clock generator may include a scan mode selection block configured to determine the operation mode of the gate clock generator, and to generate a mode signal representing the operation mode, a scan pulse generator block configured to generate the N scan clock signals based on the multi sensing enable signal received from the controller, the scan-on clock signal and the scan-off clock signal in response to the mode signal indicating the multi-clock mode, and to generate the N scan clock signals based on the scan-on clock signal and the scan-off clock signal in response to the mode signal indicating the operation mode other than the multi-clock mode, and a scan level shifter block configured to adjust voltage levels of the N scan clock signals to voltage levels suitable for a gate driver, and to provide the N scan clock signals to the gate driver.

In an embodiment, the sensing clock generator may include a sensing mode selection block configured to determine the operation mode of the gate clock generator, and to generate a mode signal representing the operation mode, a sensing pulse generator block configured to generate the N sensing clock signals based on the multi sensing enable signal received from the controller, the sensing-on clock signal and the sensing-off clock signal in response to the mode signal indicating the multi-clock mode, and to generate the N sensing clock signals based on the sensing-on clock signal and the sensing-off clock signal in response to the mode signal indicating the operation mode other than the multi-clock mode, and a sensing level shifter block configured to adjust voltage levels of the N sensing clock signals to voltage levels suitable for a gate driver, and to provide the N scan clock signals to the gate driver.

According to an embodiment, there is provided a display device including a display panel including a plurality of pixels, a data driver coupled to the plurality of pixels through a plurality of data lines, a sensing circuit coupled to the plurality of pixels through a plurality of sensing lines, a controller configured to control the data driver and the sensing circuit, and to generate a carry-on clock signal, a carry-off clock signal, a scan-on clock signal, a scan-off clock signal, a sensing-on clock signal and a sensing-off clock signal, a gate clock generator configured to sequentially generate N carry clock signals based on the carry-on clock signal and the carry-off clock signal, to generate N scan clock signals based on the scan-on clock signal and the scan-off clock signal, and to generate N sensing clock signals based on the sensing-on clock signal and the sensing-off clock signal, where N is an integer greater than 1, and a gate driver configured to provide a plurality of scan signals and a plurality of sensing signals to the plurality of pixels based on the N carry clock signals, the N scan clock signals and the N sensing clock signals. In a multi-clock mode of the display device, during an on period of a K-th carry clock signal of the N carry clock signals, where K is an integer greater than 0 and less than or equal to N, the scan clock generator outputs a K-th scan clock signal of the N scan clock signals such that the K-th scan clock signal has a number of pulses that corresponds to a number of pulses of the scan-on clock signal in the on period of the K-th carry clock signal, and the sensing clock generator outputs a K-th sensing clock signal of the N sensing clock signals such that the K-th sensing clock signal has a number of pulses that corresponds to a number of pulses of the sensing-on clock signal in the on period of the K-th carry clock signal.

In an embodiment, the gate clock generator may include a carry clock generator configured to sequentially generate the N carry clock signals based on the carry-on clock signal and the carry-off clock signal, a scan clock generator configured to generate the N scan clock signals based on the scan-on clock signal and the scan-off clock signal, and a sensing clock generator configured to generate the N sensing clock signals based on the sensing-on clock signal and the sensing-off clock signal.

In an embodiment, in the multi-clock mode, the carry clock generator may provide the N carry clock signals to the scan clock generator and the sensing clock generator.

In an embodiment, in the multi-clock mode, the carry clock generator may provide a multi sensing enable signal to the scan clock generator and the sensing clock generator.

In an embodiment, in the multi-clock mode, the controller may provide a multi sensing enable signal to the scan clock generator and the sensing clock generator.

As described above, in a gate clock generator and a display device according to an embodiment, a carry clock generator may generate N carry clock signals based on a carry-on clock signal and a carry-off clock signal, a scan clock generator may generate N scan clock signals based on a scan-on clock signal and a scan-off clock signal, and a sensing clock generator may generate N sensing clock signals based on a sensing-on clock signal and a sensing-off clock signal. Accordingly, the number of output pins of a controller of the display device and the number of input pins of the gate clock generator may be reduced compared with a conventional display device in which the carry, scan and sensing clock signals are transferred between the controller and the gate clock generator.

Further, in the gate clock generator and the display device according to an embodiment, in a multi-clock mode of the display device, the scan clock generator may output a K-th scan clock signal having any number of pulses during an on period of a K-th carry clock signal, and the sensing clock generator may output a K-th sensing clock signal having any number of pulses during the on period of the K-th carry clock signal. Accordingly, the display device may perform a multiple number of sensing operations on each pixel within one frame period.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Hereinafter, embodiments of the present inventive concept will be explained in detail with reference to the accompanying drawings.

Figure 1:
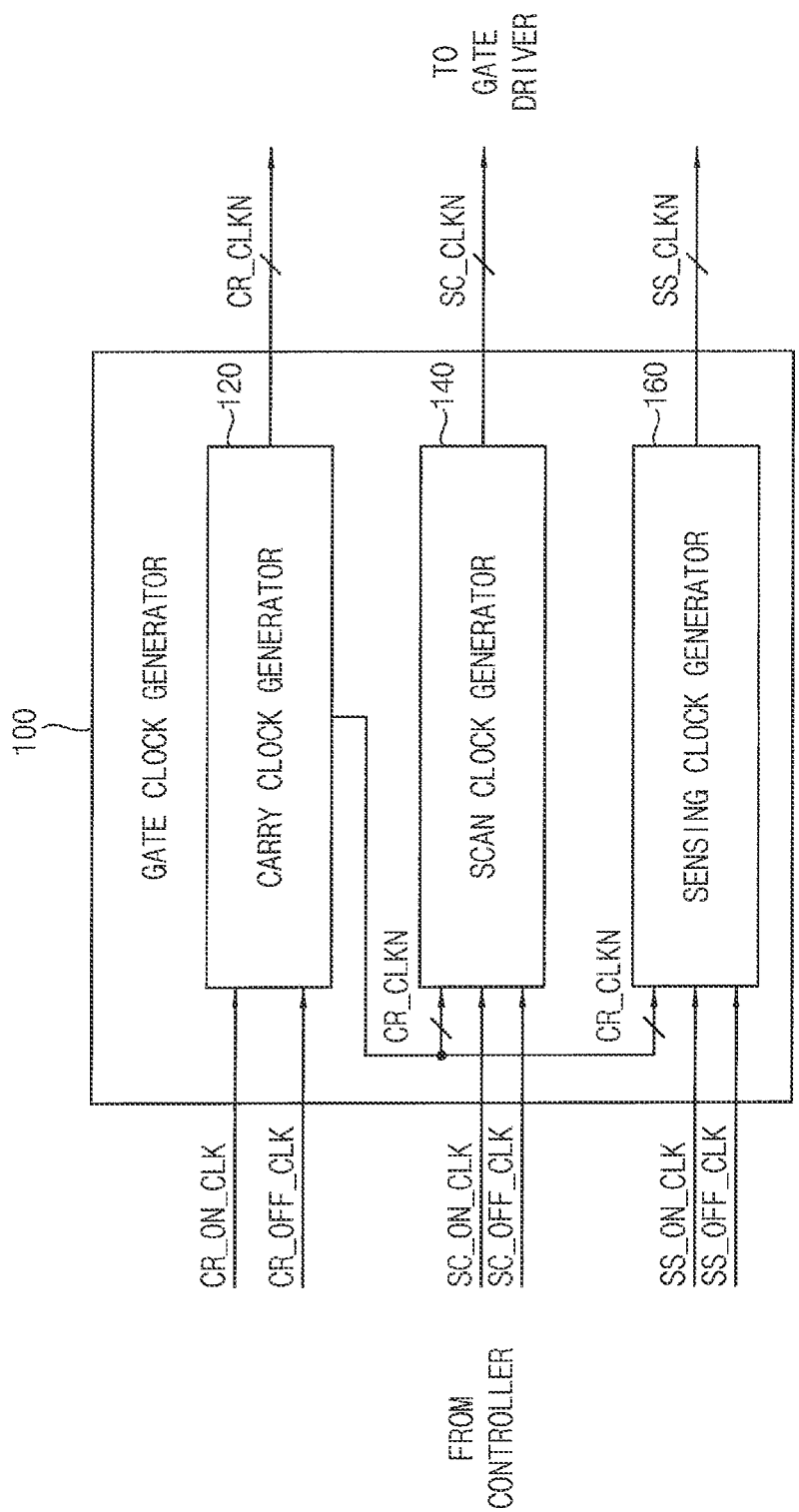
FIG. 1 is a block diagram illustrating a gate clock generator according to an embodiment.

FIG. 1 is a block diagram illustrating a gate clock generator according to an embodiment.

Referring to FIG. 1, a gate clock generator 100 of a display device according to an embodiment may include a carry clock generator 120, a scan clock generator 140 and a sensing clock generator 160.

The carry clock generator 120 may receive a carry-on clock signal CR_ON_CLK and a carry-off clock signal CR_OFF_CLK from a controller of the display device, and may sequentially generate N carry clock signals CR_CLKN based on the carry-on clock signal CR_ON_CLK and the carry-off clock signal CR_OFF_CLK, where N is an integer greater than 1. For example, the carry clock generator 120 may generate, but not limited to, two carry clock signals CR_CLKN, four carry clock signals CR_CLKN, six carry clock signals CR_CLKN, eighth carry clock signals CR_CLKN, or any number of carry clock signals CR_CLKN. In an example, the carry clock generator 120 may receive two signals, or the carry-on and off clock signals CR_ON_CLK and CR_OFF_CLK from the controller to output eight carry clock signals CR_CLKN. Accordingly, compared with a conventional gate clock generator that receives eight carry clock signals CR_CLKN to output eight carry clock signals CR_CLKN, the number of output pins of the controller and the number of input pins of the gate clock generator 100 may be reduced.

The carry clock generator 120 may provide the N carry clock signals CR_CLKN to each of the scan clock generator 140 and the sensing clock generator 160 in a multi-clock mode, and may not provide the N carry clock signals CR_CLKN to the scan clock generator 140 and the sensing clock generator 160 in an operation mode other than the multi-clock mode. In an embodiment, the operation mode of the gate clock generator 100 may include a 1-clock mode in which each scan clock signal SC_CLKN or each sensing clock signal SS_CLKN has one pulse, a 2-clock mode in which each scan clock signal SC_CLKN or each sensing clock signal SS_CLKN has two pulses, a 3-clock mode in which each scan clock signal SC_CLKN or each sensing clock signal SS_CLKN has three pulses, a 4-clock mode in which each scan clock signal SC_CLKN or each sensing clock signal SS_CLKN has four pulses, and the multi-clock mode in which each scan clock signal SC_CLKN or each sensing clock signal SS_CLKN has any number of pulses. In this case, the carry clock generator 120 may provide the N carry clock signals CR_CLKN to each of the scan clock generator 140 and the sensing clock generator 160 in the multi-clock mode, and may not provide the N carry clock signals CR_CLKN to the scan clock generator 140 and the sensing clock generator 160 in the 1-clock mode, the 2-clock mode, the 3-clock mode and the 4-clock mode.

The scan clock generator 140 may receive a scan-on clock signal SC_ON_CLK and a scan-off clock signal SC_OFF_CLK from the controller, and may sequentially generate N scan clock signals SC_CLKN based on the scan-on clock signal SC_ON_CLK and the scan-off clock signal SC_OFF_CLK. For example, the scan clock generator 140 may generate, but not limited to, two scan clock signals SC_CLKN, four scan clock signals SC_CLKN, six scan clock signals SC_CLKN, eighth scan clock signals SC_CLKN, or any number of scan clock signals SC_CLKN. In an example, the scan clock generator 140 may receive two signals, or the scan-on and off clock signals SC_ON_CLK and SC_OFF_CLK from the controller to output eight scan clock signals SC_CLKN. Accordingly, compared with a conventional gate clock generator that receives eight scan clock signals SC_CLKN to output eight scan clock signals SC_CLKN, the number of output pins of the controller and the number of input pins of the gate clock generator 100 may be reduced.

In the multi-clock mode, during an on period (e.g., a high period) of a K-th carry clock signal of the N carry clock signals CR_CLKN, where K is an integer greater than 0 and less than or equal to N, the scan clock generator 140 may output a K-th scan clock signal of the N scan clock signals SC_CLKN such that the K-th scan clock signal has pulses of which the number corresponds to the number of pulses of the scan-on clock signal SC_ON_CLK (or the number of pulses of the scan-off clock signal SC_OFF_CLK) in the on period of the K-th carry clock signal. For example, in a case where a period of the scan-on clock signal SC_ON_CLK or the scan-off clock signal SC_OFF_CLK is about one-sixth of a period of the carry-on clock signal CR_ON_CLK or the carry-off clock signal CR_OFF_CLK, or in a case where the scan-on clock signal SC_ON_CLK or the scan-off clock signal SC_OFF_CLK has six pulses during an on period of each carry clock signal CR_CLKN, the scan clock generator 140 may output a first scan clock signal having six pulses during an on period of a first carry clock signal, and may output a second scan clock signal having six pulses during an on period of a second carry clock signal. In a similar manner, during an on period of each carry clock signal CR_CLKN, the scan clock generator 140 may output a corresponding scan clock signal SC_CLKN having six pulses.

In an embodiment, in the multi-clock mode, to output the corresponding scan clock signal SC_CLKN having pulses of which the number corresponds to the number of pulses of the scan-on clock signal SC_ON_CLK (or the number of pulses of the scan-off clock signal SC_OFF_CLK) during the on period of each carry clock signal CR_CLKN, the scan clock generator 140 may receive the N carry clock signals CR_CLKN from the carry clock generator 120, and may sequentially generate the N scan clock signals SC_CLKN each having the pulses based on the N carry clock signals CR_CLKN, the scan-on clock signal SC_ON_CLK and the scan-off clock signal SC_OFF_CLK. For example, to output the K-th scan clock signal having the pulses during the on period of the K-th carry clock signal, the scan clock generator 140 may change the K-th scan clock signal to an on level (e.g., a high level) in response to each pulse of the scan-on clock signal SC_ON_CLK, and may change the K-th scan clock signal to an off level (e.g., a low level) in response to each pulse of the scan-off clock signal SC_OFF_CLK during the on period (e.g., the high period) of the K-th carry clock signal.

Further, in the operation mode other than the multi-clock mode, the scan clock generator 140 may not receive the N carry clock signals CR_CLKN, and may sequentially generate the N scan clock signals SC_CLKN based on the scan-on clock signal SC_ON_CLK and the scan-off clock signal SC_OFF_CLK regardless of the N carry clock signals CR_CLKN. For example, in a 1-clock mode, the scan clock generator 140 may sequentially generate the N scan clock signals SC_CLKN each having one pulse based on the scan-on clock signal SC_ON_CLK and the scan-off clock signal SC_OFF_CLK. Further, in the 2-clock mode, the scan clock generator 140 may sequentially generate the N scan clock signals SC_CLKN each having two pulses based on the scan-on clock signal SC_ON_CLK and the scan-off clock signal SC_OFF_CLK. Further, in the 3-clock mode, the scan clock generator 140 may sequentially generate the N scan clock signals SC_CLKN each having three pulses based on the scan-on clock signal SC_ON_CLK and the scan-off clock signal SC_OFF_CLK. Further, in the 4-clock mode, the scan clock generator 140 may sequentially generate the N scan clock signals SC_CLKN each having four pulses based on the scan-on clock signal SC_ON_CLK and the scan-off clock signal SC_OFF_CLK.

The sensing clock generator 160 may receive a sensing-on clock signal SS_ON_CLK and a sensing-off clock signal SS_OFF_CLK from the controller, and may sequentially generate N sensing clock signals SS_CLKN based on the sensing-on clock signal SS_ON_CLK and the sensing-off clock signal SS_OFF_CLK. For example, the sensing clock generator 160 may generate, but not limited to, two sensing clock signals SS_CLKN, four sensing clock signals SS_CLKN, six sensing clock signals SS_CLKN, eighth sensing clock signals SS_CLKN, or any number of sensing clock signals SS_CLKN. In an example, the sensing clock generator 160 may receive two signals, or the sensing-on and off clock signals SS_ON_CLK and SS_OFF_CLK from the controller to output eight sensing clock signals SS_CLKN. Accordingly, compared with a conventional gate clock generator that receives eight sensing clock signals SS_CLKN to output eight sensing clock signals SS_CLKN, the number of output pins of the controller and the number of input pins of the gate clock generator 100 may be reduced.

In the multi-clock mode, during the on period (e.g., the high period) of the K-th carry clock signal of the N carry clock signals CR_CLKN, the sensing clock generator 160 may output a K-th sensing clock signal of the N sensing clock signals SS_CLKN such that the K-th sensing clock signal has pulses of which the number corresponds to the number of pulses of the sensing-on clock signal SS_ON_CLK (or the number of pulses of the sensing-off clock signal SS_OFF_CLK) in the on period of the K-th carry clock signal. For example, in a case where a period of the sensing-on clock signal SS_ON_CLK or the sensing-off clock signal SS_OFF_CLK is about one-sixth of a period of the carry-on clock signal CR_ON_CLK or the carry-off clock signal CR_OFF_CLK, or in a case where the sensing-on clock signal SS_ON_CLK or the sensing-off clock signal SS_OFF_CLK has six pulses during an on period of each carry clock signal CR_CLKN, the sensing clock generator 160 may output a first sensing clock signal having six pulses during the on period of the first carry clock signal, and may output a second sensing clock signal having six pulses during the on period of the second carry clock signal. In a similar manner, during the on period of each carry clock signal CR_CLKN, the sensing clock generator 160 may output a corresponding sensing clock signal SS_CLKN having six pulses.

In an embodiment, in the multi-clock mode, to output the corresponding sensing clock signal SS_CLKN having pulses of which the number corresponds to the number of pulses of the sensing-on clock signal SS_ON_CLK (or the number of pulses of the sensing-off clock signal SS_OFF_CLK) during the on period of each carry clock signal CR_CLKN, the sensing clock generator 160 may receive the N carry clock signals CR_CLKN from the carry clock generator 120, and may sequentially generate the N sensing clock signals SS_CLKN each having the pulses based on the N carry clock signals CR_CLKN, the sensing-on clock signal SS_ON_CLK and the sensing-off clock signal SS_OFF_CLK. For example, to output the K-th sensing clock signal having the pulses during the on period of the K-th carry clock signal, the sensing clock generator 160 may change the K-th sensing clock signal to the on level (e.g., the high level) in response to each pulse of the sensing-on clock signal SS_ON_CLK, and may change the K-th sensing clock signal to the off level (e.g., the low level) in response to each pulse of the sensing-off clock signal SS_OFF_CLK during the on period (e.g., the high period) of the K-th carry clock signal.

Further, in the operation mode other than the multi-clock mode, the sensing clock generator 160 may not receive the N carry clock signals CR_CLKN, and may sequentially generate the N sensing clock signals SS_CLKN based on the sensing-on clock signal SS_ON_CLK and the sensing-off clock signal SS_OFF_CLK regardless of the N carry clock signals CR_CLKN. For example, in the 1-clock mode, the sensing clock generator 160 may sequentially generate the N sensing clock signals SS_CLKN each having one pulse based on the sensing-on clock signal SS_ON_CLK and the sensing-off clock signal SS_OFF_CLK. Further, in the 2-clock mode, the sensing clock generator 160 may sequentially generate the N sensing clock signals SS_CLKN each having two pulses based on the sensing-on clock signal SS_ON_CLK and the sensing-off clock signal SS_OFF_CLK. Further, in the 3-clock mode, the sensing clock generator 160 may sequentially generate the N sensing clock signals SS_CLKN each having three pulses based on the sensing-on clock signal SS_ON_CLK and the sensing-off clock signal SS_OFF_CLK. Further, in the 4-clock mode, the sensing clock generator 160 may sequentially generate the N sensing clock signals SS_CLKN each having four pulses based on the sensing-on clock signal SS_ON_CLK and the sensing-off clock signal SS_OFF_CLK.

A conventional gate clock generator may receive eight carry clock signals CR_CLKN, eight scan clock signals SC_CLKN and eight sensing clock signals SS_CLKN from a conventional controller to output eight carry clock signals CR_CLKN, eight scan clock signals SC_CLKN and eight sensing clock signals SS_CLKN. Thus, the conventional controller may have a number of output pins, and the conventional gate clock generator may have a number of input pins. However, the gate clock generator 100 according to an embodiment may receive the carry-on and off clock signals CR_ON_CLK and CR_OFF_CLK, the scan-on and off clock signals SC_ON_CLK and SC_OFF_CLK and the sensing-on and off clock signals SS_ON_CLK and SS_OFF_CLK from the controller, may output the N carry clock signals CR_CLKN based on the carry-on and off clock signals CR_ON_CLK and CR_OFF_CLK, may output the N scan clock signals SC_CLKN based on the sensing-on and off clock signals SS_ON_CLK and SS_OFF_CLK, and may output the N sensing clock signals SS_CLKN based on the sensing-on and off clock signals SS_ON_CLK and SS_OFF_CLK. Accordingly, compared with the conventional controller and the conventional gate clock generator, the number of output pins of the controller and the number of input pins of the gate clock generator 100 may be reduced.

Further, with respect to a conventional gate clock generator that does not support the multi-clock mode, or with respect to the conventional gate clock generator that supports only a 1-clock mode, the 2-clock mode, the 3-clock mode and the 4-clock mode, each scan clock signal SC_CLKN or each sensing clock signal SS_CLKN generated by the conventional gate clock generator may have only the limited number of pulses (e.g., in maximum four pulses). This conventional gate clock generator may not be suitable for a display device in which a number of sensing operations (e.g., tens of sensing operations or hundreds of sensing operations) are required for each pixel. However, the gate clock generator 100 according to an embodiment may have or support the multi-clock mode. In the multi-clock mode, the scan clock generator 140 may output the K-th scan clock signal having any number of pulses during the on period of the K-th carry clock signal, and the sensing clock generator 160 may output the K-th sensing clock signal having any number of pulses during the on period of the K-th carry clock signal. Accordingly, the display device including the gate clock generator 100 according to an embodiment can perform a number of sensing operations on each pixel within one frame period.

Figure 2:
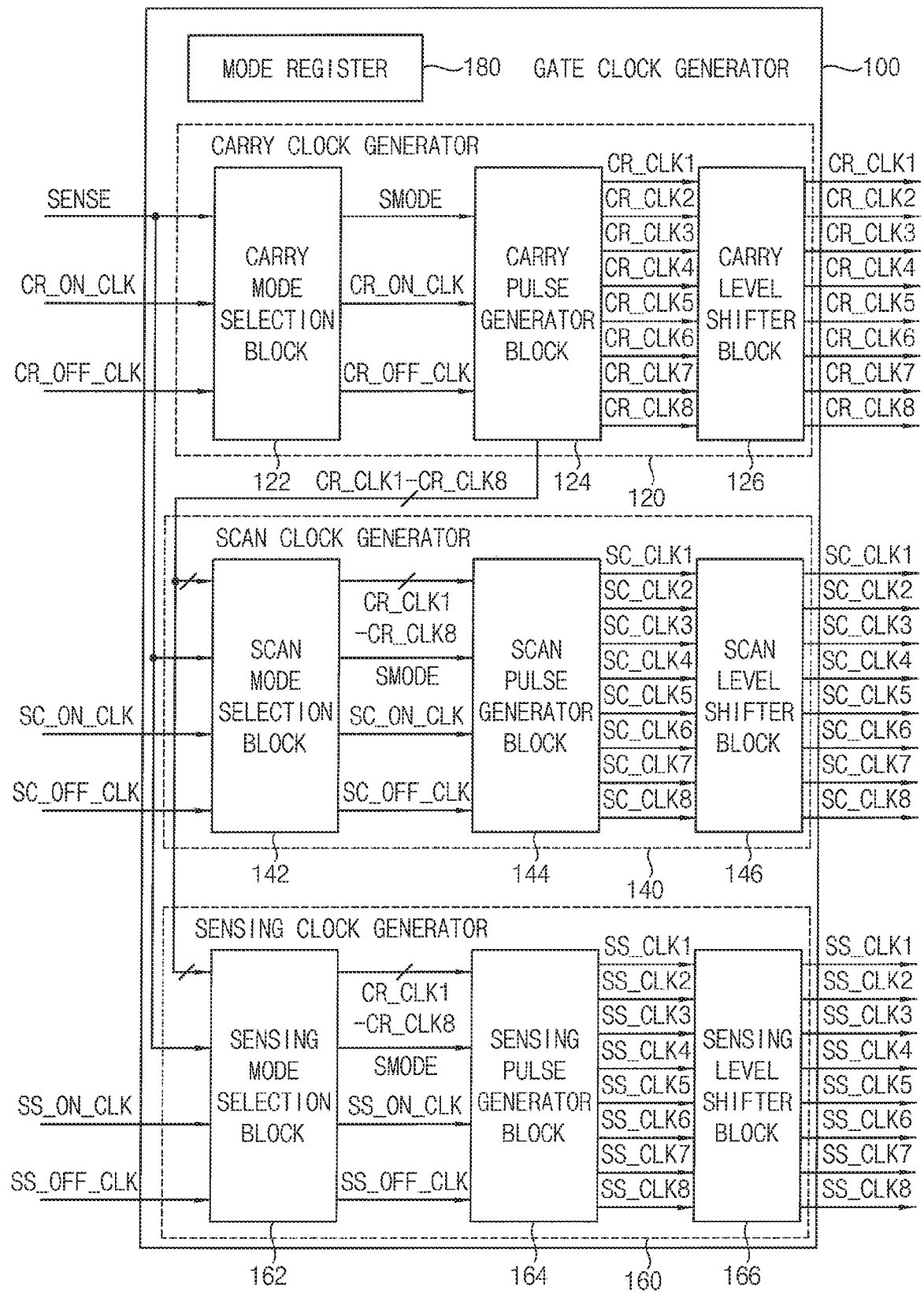
FIG. 2 is a block diagram illustrating an example of a gate clock generator according to an embodiment.
Figure 3:
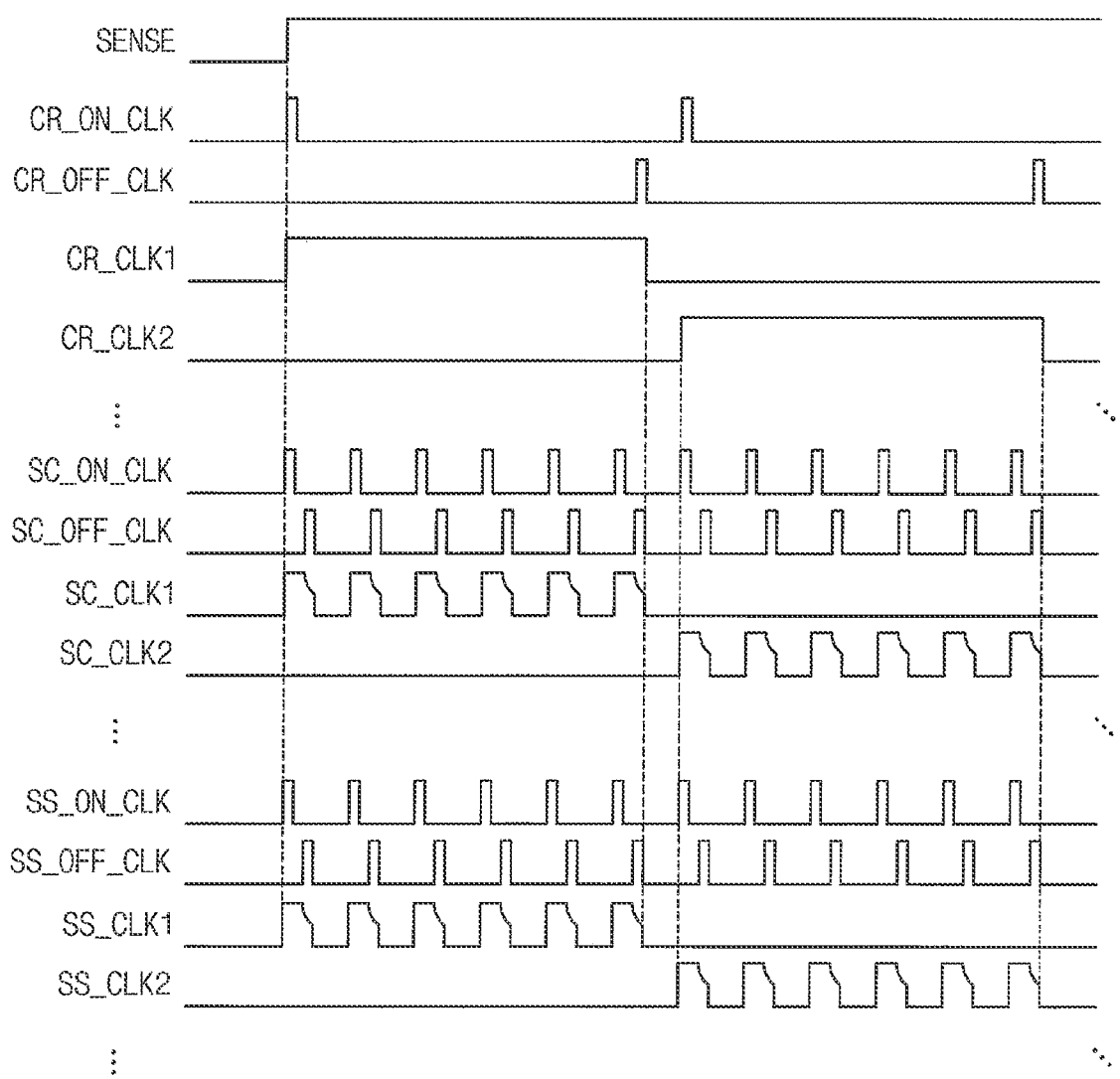
FIG. 3 is a timing diagram for describing an example of an operation of a gate clock generator in a multi-clock mode according to an embodiment.

FIG. 2 is a block diagram illustrating an example of a gate clock generator according to an embodiment, and FIG. 3 is a timing diagram for describing an example of an operation of a gate clock generator in a multi-clock mode according to an embodiment.

Referring to FIG. 2, a gate clock generator 100 of a display device according to an embodiment may include a carry clock generator 120, a scan clock generator 140 and a sensing clock generator 160. The carry clock generator 120 may include a carry mode selection block 122, a carry pulse generator block 124 and a carry level shifter block 126. The scan clock generator 140 may include a scan mode selection block 142, a scan pulse generator block 144 and a scan level shifter block 146. The sensing clock generator 160 may include a sensing mode selection block 162, a sensing pulse generator block 164 and a sensing level shifter block 166. In an embodiment, the gate clock generator 100 may further include a mode register 180.

The mode register 180 may store information representing an operation mode of the gate clock generator 100. In an embodiment, the information stored in the mode register 180 may represent a normal mode such as a 1-clock mode in which each scan/sensing clock signal has one pulse, a 2-clock mode in which each scan/sensing clock signal has two pulses, a 3-clock mode in which each scan/sensing clock signal has three pulses, a 4-clock mode in which each scan/sensing clock signal has four pulses; and a multi-clock mode in which each scan/sensing clock signal has any number of pulses. In an embodiment, when the display device is powered on, a controller of the display device may write the information representing the operation mode to the mode register 180 of the gate clock generator 100, such as through an inter-integrated circuit (I2C) communication, without limitation.

The carry mode selection block 122 may determine the operation mode of the gate clock generator 100, and may generate a mode signal SMODE representing the operation mode. In an embodiment, the carry mode selection block 122 may receive a sense signal SENSE from the controller, may determine the operation mode as the 1-clock mode, while the sense signal SENSE has an off level (e.g., a low level), and may generate the mode signal SMODE indicating the 1-clock mode. Further, while the sense signal SENSE has an on level (e.g., a high level), or during an on period (e.g., a high period) of the sense signal SENSE, the carry mode selection block 122 may determine the operation mode of the gate clock generator 100 based on the information stored in the mode register 180. For example, in a case where the information stored in the mode register 180 indicates the multi-clock mode, the carry mode selection block 122 may determine the operation mode as the multi-clock mode, and may generate the mode signal SMODE indicating the multi-clock mode.

The carry pulse generator block 124 may sequentially generate N carry clock signals, for example first through eighth carry clock signals CR_CLK1 through CR_CLK8 based on a carry-on clock signal CR_ON_CLK and a carry-off clock signal CR_OFF_CLK. Further, the carry pulse generator block 124 may receive the mode signal SMODE from the carry mode selection block 122, and may provide the first through eighth carry clock signals CR_CLK1 through CR_CLK8 to each of the scan clock generator 120 and the sensing clock generator 140 in response to the mode signal SMODE indicating the multi-clock mode. In a case where the mode signal SMODE does not indicate the multi-clock mode, or in a case where the mode signal SMODE indicates the 1-clock mode, the 2-clock mode, the 3-clock mode or the 4-clock mode, the carry pulse generator block 124 may not provide the first through eighth carry clock signals CR_CLK1 through CR_CLK8 to the scan clock generator 120 and the sensing clock generator 140.

The carry level shifter block 126 may adjust voltage levels of the first through eighth carry clock signals CR_CLK1 through CR_CLK8 to voltage levels suitable for a gate driver of the display device, and may provide the first through eighth carry clock signals CR_CLK1 through CR_CLK8 to the gate driver. In an embodiment, the carry level shifter block 126 may include, but is not limited to, eight level shifters for adjusting the voltage levels of the first through eighth carry clock signals CR_CLK1 through CR_CLK8.

The scan mode selection block 142 may determine the operation mode of the gate clock generator 100, and may generate the mode signal SMODE representing the operation mode. In an embodiment, the scan mode selection block 142 may receive the sense signal SENSE from the controller, may determine the operation mode as the 1-clock mode, while the sense signal SENSE has the off level, and may generate the mode signal SMODE indicating the 1-clock mode. Further, while the sense signal SENSE has the on level, or during the on period of the sense signal SENSE, the scan mode selection block 142 may determine the operation mode of the gate clock generator 100 based on the information stored in the mode register 180. For example, in a case where the information stored in the mode register 180 indicates the multi-clock mode, the scan mode selection block 142 may determine the operation mode as the multi-clock mode, and may generate the mode signal SMODE indicating the multi-clock mode.

The scan pulse generator block 144 may receive the mode signal SMODE from the scan mode selection block 142, and may generate first through eighth scan clock signals SC_CLK1 through SC_CLK8 based on the first through eighth carry clock signals CR_CLK1 through CR_CLK8, a scan-on clock signal SC_ON_CLK and a scan-off clock signal SC_OFF_CLK in response to the mode signal SMODE indicating the multi-clock mode. For example, during an on period of each carry clock signal (e.g., CR_CLK1), the scan pulse generator block 144 may generate a corresponding scan clock signal (e.g., SC_CLK1) having pulses of which the number corresponds to the number of pulses of the scan-on clock signal SC_ON_CLK (or the number of pulses of the scan-off clock signal SC_OFF_CLK) by changing the corresponding scan clock signal (e.g., SC_CLK1) to an on level in response to each pulse of the scan-on clock signal SC_ON_CLK and by changing the corresponding scan clock signal (e.g., SC_CLK1) to an off level in response to each pulse of the scan-off clock signal SC_OFF_CLK.

In a case where the mode signal SMODE indicates the operation mode other than the multi-clock mode, the scan pulse generator block 144 may sequentially generate the first through eighth scan clock signals SC_CLK1 through SC_CLK8 based on the scan-on clock signal SC_ON_CLK and the scan-off clock signal SC_OFF_CLK regardless of the first through eighth carry clock signals CR_CLK1 through CR_CLK8. For example, the scan pulse generator block 144 may sequentially generate the first through eighth scan clock signals SC_CLK1 through SC_CLK8 each having one pulse in response to the mode signal SMODE indicating the 1-clock mode, may sequentially generate the first through eighth scan clock signals SC_CLK1 through SC_CLK8 each having two pulses in response to the mode signal SMODE indicating the 2-clock mode, may sequentially generate the first through eighth scan clock signals SC_CLK1 through SC_CLK8 each having three pulses in response to the mode signal SMODE indicating the 3-clock mode, and may sequentially generate the first through eighth scan clock signals SC_CLK1 through SC_CLK8 each having four pulses in response to the mode signal SMODE indicating the 4-clock mode.

The scan level shifter block 146 may adjust voltage levels of the first through eighth scan clock signals SC_CLK1 through SC_CLK8 to voltage levels suitable for the gate driver, and may provide the first through eighth scan clock signals SC_CLK1 through SC_CLK8 to the gate driver. In an embodiment, the scan level shifter block 146 may include, but is not limited to, eight level shifters for adjusting the voltage levels of the first through eighth scan clock signals SC_CLK1 through SC_CLK8. Although this embodiment shows the SS_CLK signals having substantially the same signal characteristics as the SC_CLK signals, embodiments are not limited thereto. For example, one or the other may have greater pulse duration, phase offset, and/or amplitude.

The sensing mode selection block 162 may determine the operation mode of the gate clock generator 100, and may generate the mode signal SMODE representing the operation mode. In an embodiment, the sensing mode selection block 162 may receive the sense signal SENSE from the controller, may determine the operation mode as the 1-clock mode, while the sense signal SENSE has the off level, and may generate the mode signal SMODE indicating the 1-clock mode. Further, while the sense signal SENSE has the on level, or during the on period of the sense signal SENSE, the sensing mode selection block 162 may determine the operation mode of the gate clock generator 100 based on the information stored in the mode register 180. For example, in a case where the information stored in the mode register 180 indicates the multi-clock mode, the sensing mode selection block 162 may determine the operation mode as the multi-clock mode, and may generate the mode signal SMODE indicating the multi-clock mode.

The sensing pulse generator block 164 may receive the mode signal SMODE from the sensing mode selection block 162, and may generate first through eighth sensing clock signals SS_CLK1 through SS_CLK8 based on the first through eighth carry clock signals CR_CLK1 through CR_CLK8, a sensing-on clock signal SS_ON_CLK and a sensing-off clock signal SS_OFF_CLK in response to the mode signal SMODE indicating the multi-clock mode. For example, during an on period of each carry clock signal (e.g., CR_CLK1), the sensing pulse generator block 164 may generate a corresponding sensing clock signal (e.g., SS_CLK1) having pulses of which the number corresponds to the number of pulses of the sensing-on clock signal SS_ON_CLK (or the number of pulses of the sensing-off clock signal SS_OFF_CLK) by changing the corresponding sensing clock signal (e.g., SS_CLK1) to the on level in response to each pulse of the sensing-on clock signal SS_ON_CLK and by changing the corresponding sensing clock signal (e.g., SS_CLK1) to the off level in response to each pulse of the sensing-off clock signal SS_OFF_CLK.

In a case where the mode signal SMODE indicates the operation mode other than the multi-clock mode, the sensing pulse generator block 164 may sequentially generate the first through eighth sensing clock signals SS_CLK1 through SS_CLK8 based on the sensing-on clock signal SS_ON_CLK and the sensing-off clock signal SS_OFF_CLK regardless of the first through eighth carry clock signals CR_CLK1 through CR_CLK8. For example, the sensing pulse generator block 164 may sequentially generate the first through eighth sensing clock signals SS_CLK1 through SS_CLK8 each having one pulse in response to the mode signal SMODE indicating the 1-clock mode, may sequentially generate the first through eighth sensing clock signals SS_CLK1 through SS_CLK8 each having two pulses in response to the mode signal SMODE indicating the 2-clock mode, may sequentially generate the first through eighth sensing clock signals SS_CLK1 through SS_CLK8 each having three pulses in response to the mode signal SMODE indicating the 3-clock mode, and may sequentially generate the first through eighth sensing clock signals SS_CLK1 through SS_CLK8 each having four pulses in response to the mode signal SMODE indicating the 4-clock mode.

The sensing level shifter block 166 may adjust voltage levels of the first through eighth sensing clock signals SS_CLK1 through SS_CLK8 to voltage levels suitable for the gate driver, and may provide the first through eighth sensing clock signals SS_CLK1 through SS_CLK8 to the gate driver. In an embodiment, the sensing level shifter block 166 may include, but is not limited to, eight level shifters for adjusting the voltage levels of the first through eighth sensing clock signals SS_CLK1 through SS_CLK8.

Hereinafter, an example of an operation of the gate clock generator 100 in the multi-clock mode will be described below with reference to FIGS. 2 and 3.

Referring to FIGS. 2 and 3, (e.g., when a sensing operation is performed in the display device) the controller may provide the sense signal SENSE having a high level to the gate clock generator 100. While the sense signal SENSE has the high level, the carry mode selection block 122, the scan mode selection block 142 and the sensing mode selection block 162 may determine the operation mode of the gate clock generator 100 based on the information stored in the mode register 180. Further, in a case where the information stored in the mode register 180 indicates the multi-clock mode, each of the carry mode selection block 122, the scan mode selection block 142 and the sensing mode selection block 162 may generate the mode signal SMODE indicating the multi-clock mode.

The carry pulse generator block 124 may generate the first carry clock signal CR_CLK1 that has a rising edge in response to a first pulse of the carry-on clock signal CR_ON_CLK and has a falling edge in response to a first pulse of the carry-off clock signal CR_OFF_CLK, and may generate the second carry clock signal CR_CLK2 that has a rising edge in response to a second pulse of the carry-on clock signal CR_ON_CLK and has a falling edge in response to a second pulse of the carry-off clock signal CR_OFF_CLK. In this manner, the carry pulse generator block 124 may generate the eighth carry clock signal CR_CLK8 that has a rising edge in response to an eighth pulse of the carry-on clock signal CR_ON_CLK and has a falling edge in response to an eighth pulse of the carry-off clock signal CR_OFF_CLK. Further, the carry pulse generator block 124 may repeat the sequential generation of the first through eighth carry clock signals CR_CLK1 through CR_CLK8 until the sense signal SENSE becomes a low level. Further, the carry pulse generator block 124 may provide the first through eighth carry clock signals CR_CLK1 through CR_CLK8 to each of the scan clock generator 120 and the sensing clock generator 140.

The scan pulse generator block 144 may generate the first scan clock signal SC_CLK1 that has a rising edge in response to each pulse of the scan-on clock signal SC_ON_CLK and has a falling edge in response to each pulse of the scan-off clock signal SC_OFF_CLK during a high period of the first carry clock signal CR_CLK1, and may generate the second scan clock signal SC_CLK2 that has a rising edge in response to each pulse of the scan-on clock signal SC_ON_CLK and has a falling edge in response to each pulse of the scan-off clock signal SC_OFF_CLK during a high period of the second carry clock signal CR_CLK2. In this manner, the scan pulse generator block 144 may generate the eighth scan clock signal SC_CLK8 that has a rising edge in response to each pulse of the scan-on clock signal SC_ON_CLK and has a falling edge in response to each pulse of the scan-off clock signal SC_OFF_CLK during a high period of the eighth carry clock signal CR_CLK8. Accordingly, the number of toggling or the number of pulses of each scan clock signal SC_CLK1 through SC_CLK8 may be determined by the number of pulses of the scan-on clock signal SC_ON_CLK (or the number of pulses of the scan-off clock signal SC_OFF_CLK) in the high period (i.e., the on period) of a corresponding carry clock signal CR_CLK1 through CR_CLK8, and the controller may adjust the number of pulses of each scan clock signal SC_CLK1 through SC_CLK8 to any number of pulses (e.g., tens of pulses or hundreds of pulses) by adjusting a time length of the on period of each carry clock signal CR_CLK1 through CR_CLK8. Further, the scan pulse generator block 144 may repeat the sequential generation of the first through eighth scan clock signals SC_CLK1 through SC_CLK8 until the sense signal SENSE becomes the low level.

The sensing pulse generator block 164 may generate the first sensing clock signal SS_CLK1 that has a rising edge in response to each pulse of the sensing-on clock signal SS_ON_CLK and has a falling edge in response to each pulse of the sensing-off clock signal SS_OFF_CLK during the high period of the first carry clock signal CR_CLK1, and may generate the second sensing clock signal SS_CLK2 that has a rising edge in response to each pulse of the sensing-on clock signal SS_ON_CLK and has a falling edge in response to each pulse of the sensing-off clock signal SS_OFF_CLK during the high period of the second carry clock signal CR_CLK2. In this manner, the sensing pulse generator block 164 may generate the eighth sensing clock signal SS_CLK8 that has a rising edge in response to each pulse of the sensing-on clock signal SS_ON_CLK and has a falling edge in response to each pulse of the sensing-off clock signal SS_OFF_CLK during the high period of the eighth carry clock signal CR_CLK8. Accordingly, the number of toggling or the number of pulses of each sensing clock signal SS_CLK1 through SS_CLK8 may be determined by the number of pulses of the sensing-on clock signal SS_ON_CLK (or the number of pulses of the sensing-off clock signal SS_OFF_CLK) in the high period (i.e., the on period) of a corresponding carry clock signal CR_CLK1 through CR_CLK8, and the controller may adjust the number of pulses of each sensing clock signal SS_CLK1 through SS_CLK8 to any number of pulses (e.g., tens of pulses or hundreds of pulses) by adjusting a time length of the on period of each carry clock signal CR_CLK1 through CR_CLK8. Further, the sensing pulse generator block 164 may repeat the sequential generation of the first through eighth sensing clock signals SS_CLK1 through SS_CLK8 until the sense signal SENSE becomes the low level.

Figure 4:
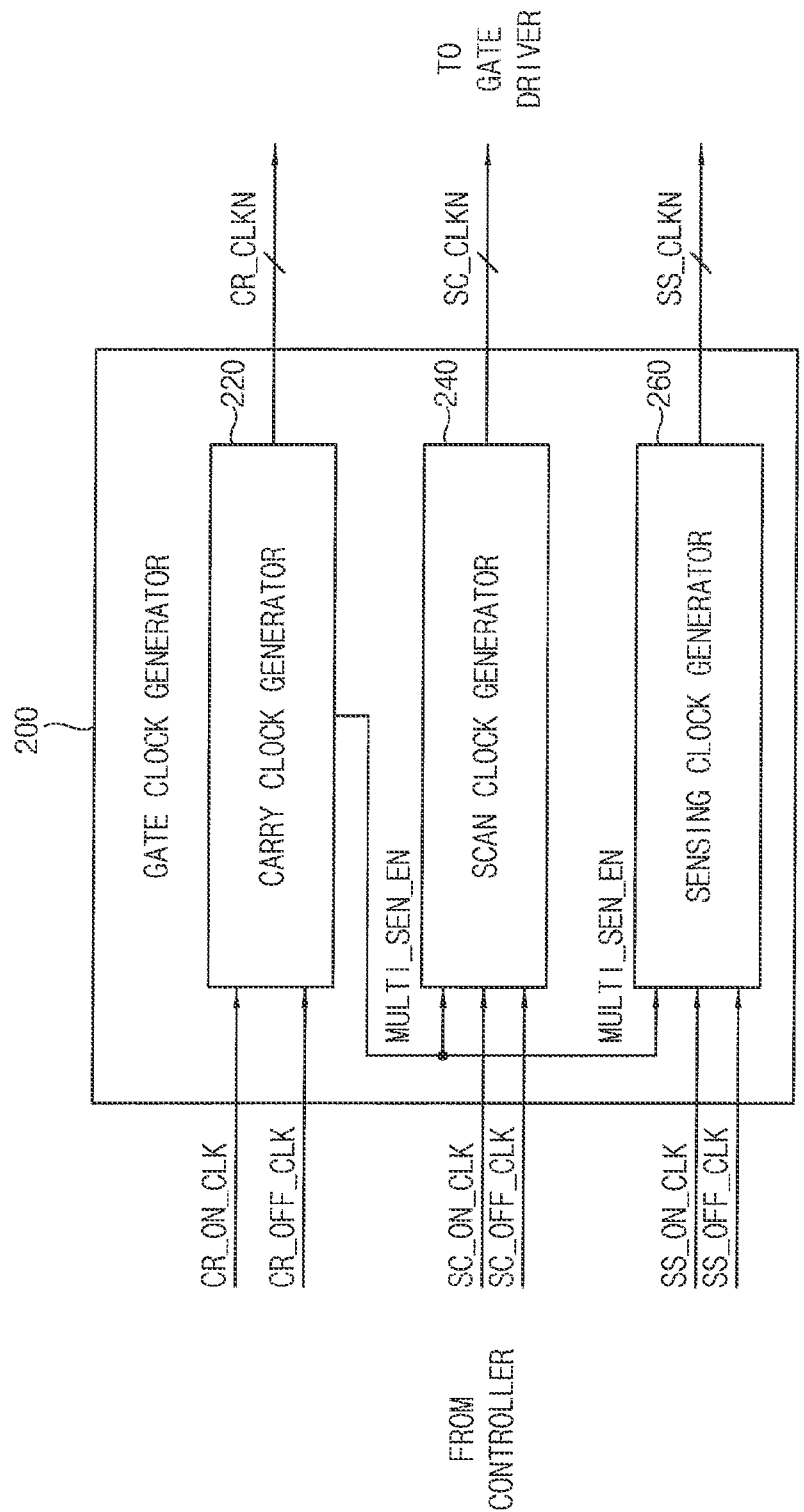
FIG. 4 is a block diagram illustrating a gate clock generator according to an embodiment.

FIG. 4 is a block diagram illustrating a gate clock generator according to an embodiment.

Referring to FIG. 4, a gate clock generator 200 of a display device according to an embodiment may include a carry clock generator 220, a scan clock generator 240 and a sensing clock generator 260. The gate clock generator 200 of FIG. 4 may have a similar configuration and a similar operation to a gate clock generator 100 of FIG. 1, except that the carry clock generator 220 may provide a multi sense enable signal MULTI_SEN_EN instead of N carry clock signals CR_CLKN to the scan clock generator 240 and the sensing clock generator 260 in a multi-clock mode.

In the multi-clock mode, the carry clock generator 220 may sequentially generate N carry clock signals CR_CLKN based on a carry-on clock signal CR_ON_CLK and a carry-off clock signal CR_OFF_CLK, and generate the multi sense enable signal MULTI_SEN_EN that has an on period (e.g., a high period) each time any one of the N carry clock signals CR_CLKN has the on period (e.g., the high period). Further, the carry clock generator 220 may provide the multi sensing enable signal MULTI_SEN_EN to each of the scan clock generator 240 and the sensing clock generator 260. In an operation mode such as a normal mode, a 1-clock mode, a 2-clock mode, a 3-clock mode or a 4-clock mode other than the multi-clock mode, the carry clock generator 220 may not provide the multi sensing enable signal MULTI_SEN_EN to the scan clock generator 240 and the sensing clock generator 260.

In the multi-clock mode, the scan clock generator 240 may generate N scan clock signals SC_CLKN based on the multi sensing enable signal MULTI_SEN_EN, a scan-on clock signal SC_ON_CLK and a scan-off clock signal SC_OFF_CLK. During a (N*M+K)-th on period (e.g., a (N*M+K)-th high period) of the multi sensing enable signal MULTI_SEN_EN, where K is an integer greater than 0 and less than or equal to N, and M is an integer greater than or equal to 0, the scan clock generator 240 may output a K-th scan clock signal of the N scan clock signals SC_CLKN such that the K-th scan clock signal has pulses of which the number corresponds to the number of pulses of the scan-on clock signal SC_ON_CLK (or the number of pulses of the scan-off clock signal SC_OFF_CLK) in the (N*M+K)-th on period. For example, during a first on period of the multi sensing enable signal MULTI_SEN_EN, the scan clock generator 240 may generate a first scan clock signal of the N scan clock signals SC_CLKN having pulses of which the number corresponds to the number of pulses of the scan-on clock signal SC_ON_CLK (or the number of pulses of the scan-off clock signal SC_OFF_CLK) by changing the first scan clock signal to an on level in response to each pulse of the scan-on clock signal SC_ON_CLK and by changing the first scan clock signal to an off level in response to each pulse of the scan-off clock signal SC_OFF_CLK. Further, during a second on period of the multi sensing enable signal MULTI_SEN_EN, the scan clock generator 240 may generate a second scan clock signal of the N scan clock signals SC_CLKN having pulses of which the number corresponds to the number of pulses of the scan-on clock signal SC_ON_CLK (or the number of pulses of the scan-off clock signal SC_OFF_CLK) by changing the second scan clock signal to the on level in response to each pulse of the scan-on clock signal SC_ON_CLK and by changing the second scan clock signal to the off level in response to each pulse of the scan-off clock signal SC_OFF_CLK. In this manner, during an N-th on period of the multi sensing enable signal MULTI_SEN_EN, the scan clock generator 240 may generate an N-th scan clock signal of the N scan clock signals SC_CLKN having pulses of which the number corresponds to the number of pulses of the scan-on clock signal SC_ON_CLK (or the number of pulses of the scan-off clock signal SC_OFF_CLK) by changing the N-th scan clock signal to the on level in response to each pulse of the scan-on clock signal SC_ON_CLK and by changing the N-th scan clock signal to the off level in response to each pulse of the scan-off clock signal SC_OFF_CLK. Thereafter, the scan clock generator 240 may repeat the sequential generation of the first through N-th scan clock signals SC_CLKN.

In the multi-clock mode, the sensing clock generator 260 may generate N sensing clock signals SS_CLKN based on the multi sensing enable signal MULTI_SEN_EN, a sensing-on clock signal SS_ON_CLK and a sensing-off clock signal SS_OFF_CLK. During the (N*M+K)-th on period (e.g., the (N*M+K)-th high period) of the multi sensing enable signal MULTI_SEN_EN, the sensing clock generator 260 may output a K-th sensing clock signal of the N sensing clock signals SS_CLKN such that the K-th sensing clock signal has pulses of which the number corresponds to the number of pulses of the sensing-on clock signal SS_ON_CLK (or the number of pulses of the sensing-off clock signal SS_OFF_CLK) in the (N*M+K)-th on period. For example, during the first on period of the multi sensing enable signal MULTI_SEN_EN, the sensing clock generator 260 may generate a first sensing clock signal of the N sensing clock signals SS_CLKN having pulses of which the number corresponds to the number of pulses of the sensing-on clock signal SS_ON_CLK (or the number of pulses of the sensing-off clock signal SS_OFF_CLK) by changing the first sensing clock signal to the on level in response to each pulse of the sensing-on clock signal SS_ON_CLK and by changing the first sensing clock signal to the off level in response to each pulse of the sensing-off clock signal SS_OFF_CLK. Further, during the second on period of the multi sensing enable signal MULTI_SEN_EN, the sensing clock generator 260 may generate a second sensing clock signal of the N sensing clock signals SS_CLKN having pulses of which the number corresponds to the number of pulses of the sensing-on clock signal SS_ON_CLK (or the number of pulses of the sensing-off clock signal SS_OFF_CLK) by changing the second sensing clock signal to the on level in response to each pulse of the sensing-on clock signal SS_ON_CLK and by changing the second sensing clock signal to the off level in response to each pulse of the sensing-off clock signal SS_OFF_CLK. In this manner, during the N-th on period of the multi sensing enable signal MULTI_SEN_EN, the sensing clock generator 260 may generate an N-th sensing clock signal of the N sensing clock signals SS_CLKN having pulses of which the number corresponds to the number of pulses of the sensing-on clock signal SS_ON_CLK (or the number of pulses of the sensing-off clock signal SS_OFF_CLK) by changing the N-th sensing clock signal to the on level in response to each pulse of the sensing-on clock signal SS_ON_CLK and by changing the N-th sensing clock signal to the off level in response to each pulse of the sensing-off clock signal SS_OFF_CLK. Thereafter, the sensing clock generator 260 may repeat the sequential generation of the first through N-th sensing clock signals SS_CLKN.

As described above, the gate clock generator 200 according to an embodiment may have or support the multi-clock mode. In the multi-clock mode, the carry clock generator 220 may generate the multi sense enable signal MULTI_SEN_EN, the scan clock generator 240 may output a corresponding scan clock signal having any number of pulses in each on period of the multi sense enable signal MULTI_SEN_EN, and the sensing clock generator 260 may output a corresponding sensing clock signal having any number of pulses in each on period of the multi sense enable signal MULTI_SEN_EN. Accordingly, the display device including the gate clock generator 200 according to an embodiment can perform a number of sensing operations on each pixel within one frame period.

Figure 5:
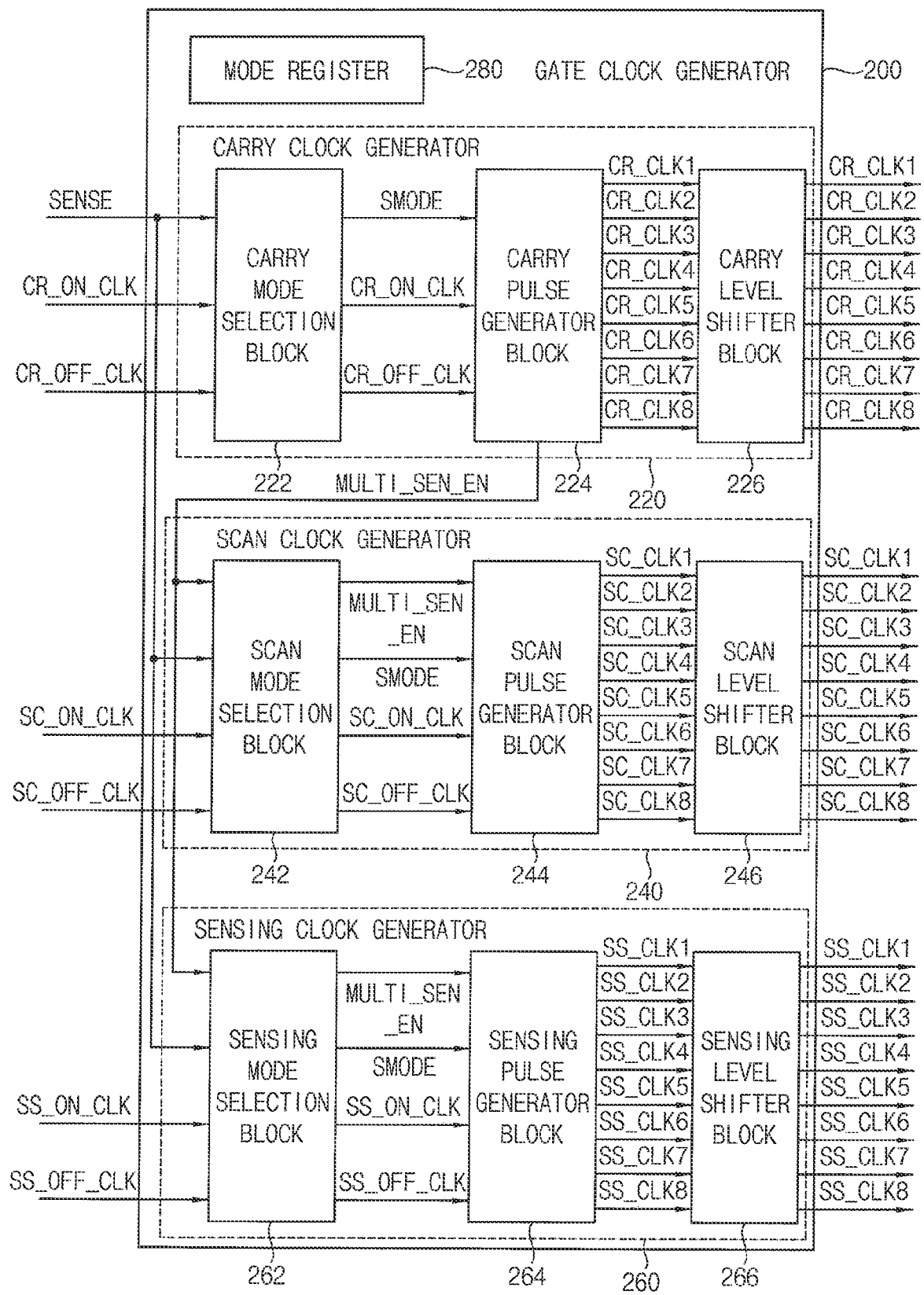
FIG. 5 is a block diagram illustrating an example of a gate clock generator according to an embodiment.
Figure 6:
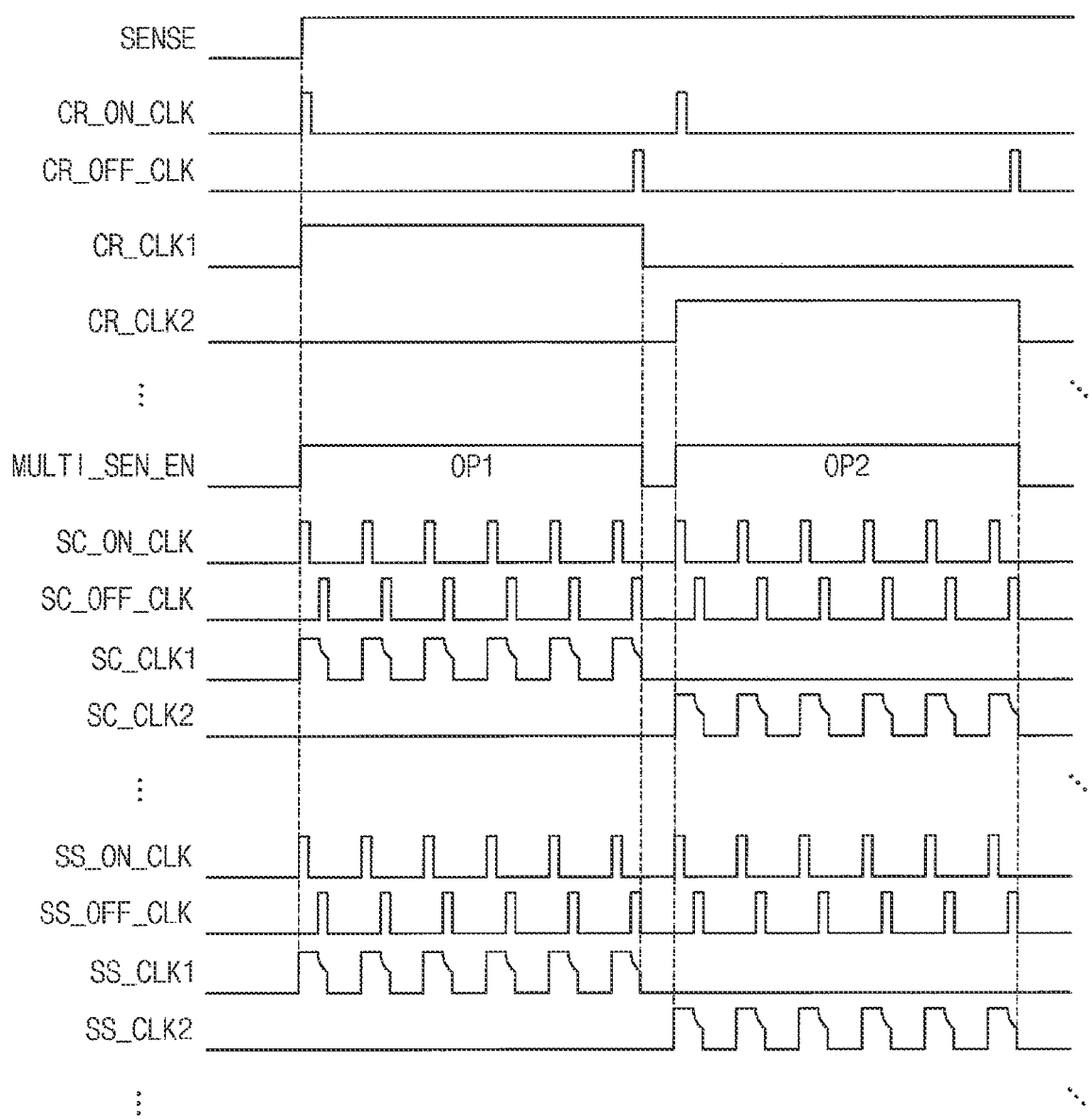
FIG. 6 is a timing diagram for describing an example of an operation of a gate clock generator in a multi-clock mode according to an embodiment.

FIG. 5 is a block diagram illustrating an example of a gate clock generator according to an embodiment, and FIG. 6 is a timing diagram for describing an example of an operation of a gate clock generator in a multi-clock mode according to an embodiment.

Referring to FIG. 5, a gate clock generator 200 of a display device according to an embodiment may include a carry clock generator 220, a scan clock generator 240 and a sensing clock generator 260. The carry clock generator 220 may include a carry mode selection block 222, a carry pulse generator block 224 and a carry level shifter block 226. The scan clock generator 240 may include a scan mode selection block 242, a scan pulse generator block 244 and a scan level shifter block 246. The sensing clock generator 260 may include a sensing mode selection block 262, a sensing pulse generator block 264 and a sensing level shifter block 266. In an embodiment, the gate clock generator 200 may further include a mode register 280. The gate clock generator 200 of FIG. 5 may have a similar configuration and a similar operation to a gate clock generator 100 of FIG. 2, except that the carry clock generator 220 may provide a multi sense enable signal MULTI_SEN_EN instead of first through eighth carry clock signals CR_CLK1 through CR_CLK8 to the scan clock generator 240 and the sensing clock generator 260 in a multi-clock mode.

The carry pulse generator block 224 may selectively provide the multi sense enable signal MULTI_SEN_EN to the scan clock generator 240 and the sensing clock generator 260 in response to a mode signal SMODE. For example, in response to the mode signal SMODE indicating the multi-clock mode, the carry pulse generator block 224 may provide each of the scan clock generator 240 and the sensing clock generator 260 with the multi sense enable signal MULTI_SEN_EN that has an on period each time at least one or any one of the first through eighth carry clock signals CR_CLK1 through CR_CLK8 has the on period. In an operation mode such as a normal mode, a 1-clock mode, a 2-clock mode, a 3-clock mode or a 4-clock mode other than the multi-clock mode, the carry pulse generator block 224 may not provide the multi sensing enable signal MULTI_SEN_EN to the scan clock generator 240 and the sensing clock generator 260.

The scan pulse generator block 244 may receive the mode signal SMODE from the scan mode selection block 242, and may generate first through eighth scan clock signals SC_CLK1 through SC_CLK8 based on the multi sensing enable signal MULTI_SEN_EN, a scan-on clock signal SC_ON_CLK and a scan-off clock signal SC_OFF_CLK in response to the mode signal SMODE indicating the multi-clock mode. For example, during a (8*M+K)-th on period (e.g., a (8*M+K)-th high period) of the multi sensing enable signal MULTI_SEN_EN, where K is an integer greater than 0 and less than or equal to 8, and M is an integer greater than or equal to 0, the scan pulse generator block 244 may output a K-th scan clock signal having pulses of which the number corresponds to the number of pulses of the scan-on clock signal SC_ON_CLK (or the number of pulses of the scan-off clock signal SC_OFF_CLK) in the (8*M+K)-th on period. In a case where the mode signal SMODE indicates the operation mode other than the multi-clock mode, the scan pulse generator block 244 may sequentially generate the first through eighth scan clock signals SC_CLK1 through SC_CLK8 based on the scan-on clock signal SC_ON_CLK and the scan-off clock signal SC_OFF_CLK regardless of the multi sensing enable signal MULTI_SEN_EN.

The sensing pulse generator block 264 may receive the mode signal SMODE from the sensing mode selection block 262, and may generate first through eighth sensing clock signals SS_CLK1 through SS_CLK8 based on the multi sensing enable signal MULTI_SEN_EN, a sensing-on clock signal SS_ON_CLK and a sensing-off clock signal SS_OFF_CLK in response to the mode signal SMODE indicating the multi-clock mode. For example, during the (8*M+K)-th on period of the multi sensing enable signal MULTI_SEN_EN, the sensing pulse generator block 264 may output a K-th sensing clock signal having pulses of which the number corresponds to the number of pulses of the sensing-on clock signal SS_ON_CLK (or the number of pulses of the sensing-off clock signal SS_OFF_CLK) in the (8*M+K)-th on period. In a case where the mode signal SMODE indicates the operation mode other than the multi-clock mode, the sensing pulse generator block 264 may sequentially generate the first through eighth sensing clock signals SS_CLK1 through SS_CLK8 based on the sensing-on clock signal SS_ON_CLK and the sensing-off clock signal SS_OFF_CLK regardless of the multi sensing enable signal MULTI_SEN_EN.

Hereinafter, an example of an operation of the gate clock generator 200 in the multi-clock mode will be described below with reference to FIGS. 5 and 6. The operation of the gate clock generator 200 illustrated in FIG. 6 may be similar to an operation of a gate clock generator 100 illustrated in FIG. 3, except that the scan clock generator 240 and the sensing clock generator 260 may operate based on the multi sensing enable signal MULTI_SEN_EN instead of the first through eighth carry clock signals CR_CLK1 through CR_CLK8 in the multi-clock mode.

Referring to FIGS. 5 and 6, in the multi-clock mode, the carry pulse generator block 224 may generate the multi sense enable signal MULTI_SEN_EN that has the on period each time at least one or any one of the first through eighth carry clock signals CR_CLK1 through CR_CLK8 has the on period. For example, the multi sense enable signal MULTI_SEN_EN may sequentially have a first on period OP1 corresponding to an on period of the first carry clock signal CR_CLK1, a second on period OP2 corresponding to an on period of the second carry clock signal CR_CLK2, and on periods corresponding to on periods of the third through eighth carry clock signals CR_CLK3 through CR_CLK8. Thereafter, the multi sense enable signal MULTI_SEN_EN may again have the first on period OP1 corresponding to the on period of the first carry clock signal CR_CLK1. Further, the carry pulse generator block 224 may provide the multi sense enable signal MULTI_SEN_EN to each of the scan clock generator 240 and the sensing clock generator 260.

The scan pulse generator block 244 may generate the first scan clock signal SC_CLK1 that has a rising edge in response to each pulse of the scan-on clock signal SC_ON_CLK and has a falling edge in response to each pulse of the scan-off clock signal SC_OFF_CLK during the first on period OP1 of the multi sense enable signal MULTI_SEN_EN, and may generate the second scan clock signal SC_CLK2 that has a rising edge in response to each pulse of the scan-on clock signal SC_ON_CLK and has a falling edge in response to each pulse of the scan-off clock signal SC_OFF_CLK during the second on period OP2 of the multi sense enable signal MULTI_SEN_EN. In this manner, the scan pulse generator block 244 may generate the eighth scan clock signal SC_CLK8 that has a rising edge in response to each pulse of the scan-on clock signal SC_ON_CLK and has a falling edge in response to each pulse of the scan-off clock signal SC_OFF_CLK during an eighth on period of the multi sense enable signal MULTI_SEN_EN. Accordingly, the number of toggling or the number of pulses of each scan clock signal SC_CLK1 through SC_CLK8 may be determined by the number of pulses of the scan-on clock signal SC_ON_CLK (or the number of pulses of the scan-off clock signal SC_OFF_CLK) in each high period (i.e., each on period) of the multi sense enable signal MULTI_SEN_EN, and the number of pulses of each scan clock signal SC_CLK1 through SC_CLK8 may be adjusted to any number of pulses (e.g., tens of pulses or hundreds of pulses). Further, the scan pulse generator block 244 may repeat the sequential generation of the first through eighth scan clock signals SC_CLK1 through SC_CLK8 until the sense signal SENSE becomes a low level.

The sensing pulse generator block 264 may generate the first sensing clock signal SS_CLK1 that has a rising edge in response to each pulse of the sensing-on clock signal SS_ON_CLK and has a falling edge in response to each pulse of the sensing-off clock signal SS_OFF_CLK during the first on period OP1 of the multi sense enable signal MULTI_SEN_EN, and may generate the second sensing clock signal SS_CLK2 that has a rising edge in response to each pulse of the sensing-on clock signal SS_ON_CLK and has a falling edge in response to each pulse of the sensing-off clock signal SS_OFF_CLK during the second on period OP2 of the multi sense enable signal MULTI_SEN_EN. In this manner, the sensing pulse generator block 264 may generate the eighth sensing clock signal SS_CLK8 that has a rising edge in response to each pulse of the sensing-on clock signal SS_ON_CLK and has a falling edge in response to each pulse of the sensing-off clock signal SS_OFF_CLK during the eighth on period of the multi sense enable signal MULTI_SEN_EN. Accordingly, the number of toggling or the number of pulses of each sensing clock signal SS_CLK1 through SS_CLK8 may be determined by the number of pulses of the sensing-on clock signal SS_ON_CLK (or the number of pulses of the sensing-off clock signal SS_OFF_CLK) in each high period (i.e., each on period) of the multi sense enable signal MULTI_SEN_EN, and the number of pulses of each sensing clock signal SS_CLK1 through SS_CLK8 may be adjusted to any number of pulses (e.g., tens of pulses or hundreds of pulses). Further, the sensing pulse generator block 264 may repeat the sequential generation of the first through eighth sensing clock signals SS_CLK1 through SS_CLK8 until the sense signal SENSE becomes the low level. Although this embodiment shows the SS_CLK signals having substantially the same signal characteristics as the SC_CLK signals, embodiments are not limited thereto. For example, one or the other may have greater pulse duration, phase offset, and/or amplitude.

Figure 7:
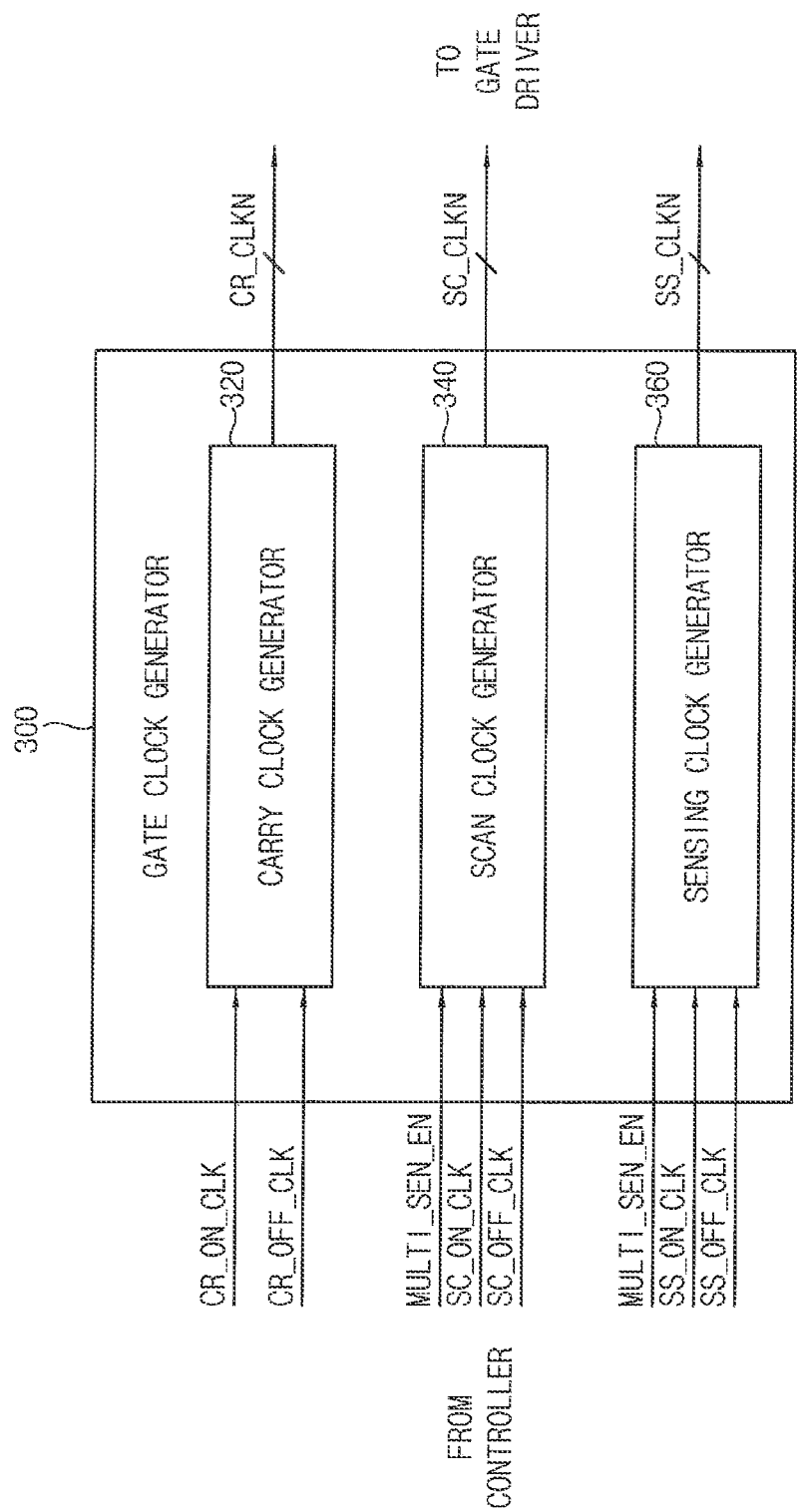
FIG. 7 is a block diagram illustrating a gate clock generator according to an embodiment.
Figure 8:
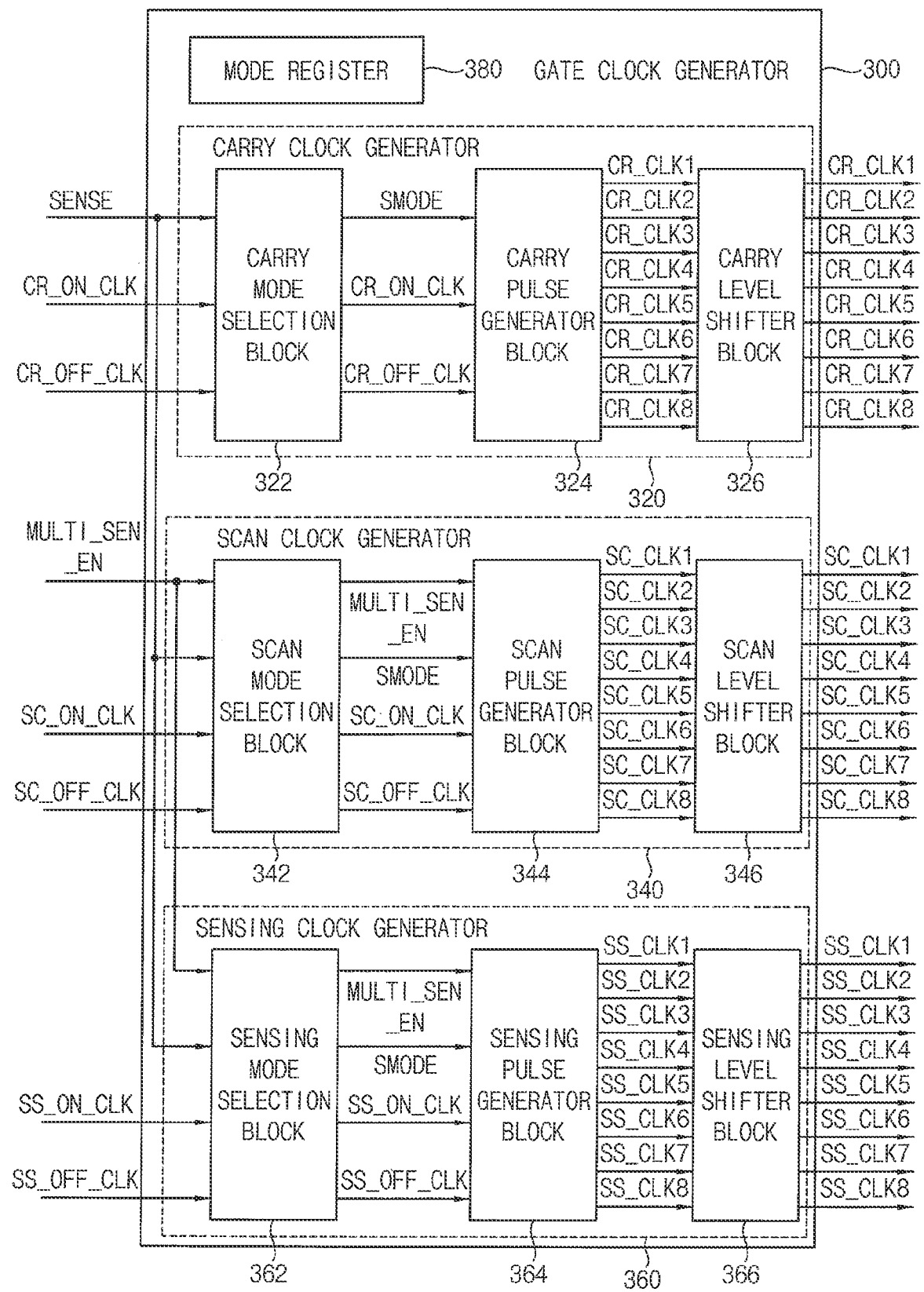
FIG. 8 is a block diagram illustrating an example of a gate clock generator according to an embodiment.

FIG. 7 is a block diagram illustrating a gate clock generator according to an embodiment, and FIG. 8 is a block diagram illustrating an example of a gate clock generator according to an embodiment.

Referring to FIGS. 7 and 8, a gate clock generator 300 of a display device according to an embodiment may include a carry clock generator 320, a scan clock generator 340 and a sensing clock generator 360. The carry clock generator 320 may include a carry mode selection block 322, a carry pulse generator block 324 and a carry level shifter block 326. The scan clock generator 340 may include a scan mode selection block 342, a scan pulse generator block 344 and a scan level shifter block 346. The sensing clock generator 360 may include a sensing mode selection block 362, a sensing pulse generator block 364 and a sensing level shifter block 366. In an embodiment, the gate clock generator 300 may further include a mode register 380. The gate clock generator 300 of FIGS. 7 and 8 may have a similar configuration and a similar operation to a gate clock generator 200 of FIGS. 4 and 5, except that the scan clock generator 340 and the sensing clock generator 360 may receive a multi sense enable signal MULTI_SEN_EN not from the carry clock generator 320 but from a controller of the display device.

The carry clock generator 320 may receive a carry-on clock signal CR_ON_CLK and a carry-off clock signal CR_OFF_CLK from the controller, and may sequentially generate N carry clock signals CR_CLKN based on the carry-on clock signal CR_ON_CLK and the carry-off clock signal CR_OFF_CLK, where N is an integer greater than 1. In an embodiment, an operation of the carry clock generator 320 in a multi-clock mode may be, but not be limited to, substantially the same as an operation of the carry clock generator 320 in an operation mode other than the multi-clock mode.

The scan clock generator 340 may receive the multi sensing enable signal MULTI_SEN_EN, a scan-on clock signal SC_ON_CLK and a scan-off clock signal SC_OFF_CLK from the controller, may sequentially generate N scan clock signals SC_CLKN based on the multi sensing enable signal MULTI_SEN_EN, the scan-on clock signal SC_ON_CLK and the scan-off clock signal SC_OFF_CLK in the multi-clock mode, and may sequentially generate the N scan clock signals SC_CLKN based on the scan-on clock signal SC_ON_CLK and the scan-off clock signal SC_OFF_CLK regardless of the multi sensing enable signal MULTI_SEN_EN in the operation mode such as a normal mode, a 1-clock mode, a 2-clock mode, a 3-clock mode or a 4-clock mode other than the multi-clock mode. In an embodiment, the scan pulse generator block 344 may generate first through eighth scan clock signals SC_CLK1 through SC_CLK8 based on the multi sensing enable signal MULTI_SEN_EN, the scan-on clock signal SC_ON_CLK and the scan-off clock signal SC_OFF_CLK in response to a mode signal SMODE indicating the multi-clock mode, and may generate the first through eighth scan clock signals SC_CLK1 through SC_CLK8 based on the scan-on clock signal SC_ON_CLK and the scan-off clock signal SC_OFF_CLK in response to the mode signal SMODE indicating the operation mode other than the multi-clock mode. For example, in the multi-clock mode, the scan pulse generator block 344 may generate the first scan clock signal SC_CLK1 that has a rising edge in response to each pulse of the scan-on clock signal SC_ON_CLK and has a falling edge in response to each pulse of the scan-off clock signal SC_OFF_CLK during a first on period of the multi sense enable signal MULTI_SEN_EN, and may generate the second scan clock signal SC_CLK2 that has a rising edge in response to each pulse of the scan-on clock signal SC_ON_CLK and has a falling edge in response to each pulse of the scan-off clock signal SC_OFF_CLK during a second on period of the multi sense enable signal MULTI_SEN_EN.

The sensing clock generator 360 may receive the multi sensing enable signal MULTI_SEN_EN, a sensing-on clock signal SS_ON_CLK and a sensing-off clock signal SS_OFF_CLK from the controller, may sequentially generate N sensing clock signals SS_CLKN based on the multi sensing enable signal MULTI_SEN_EN, the sensing-on clock signal SS_ON_CLK and the sensing-off clock signal SS_OFF_CLK in the multi-clock mode, and may sequentially generate the N sensing clock signals SS_CLKN based on the sensing-on clock signal SS_ON_CLK and the sensing-off clock signal SS_OFF_CLK regardless of the multi sensing enable signal MULTI_SEN_EN in the operation mode (e.g., the 1-clock mode, the 2-clock mode, the 3-clock mode or the 4-clock mode) other than the multi-clock mode. In an embodiment, the sensing pulse generator block 364 may generate first through eighth sensing clock signals SS_CLK1 through SS_CLK8 based on the multi sensing enable signal MULTI_SEN_EN, the sensing-on clock signal SS_ON_CLK and the sensing-off clock signal SS_OFF_CLK in response to the mode signal SMODE indicating the multi-clock mode, and may generate the first through eighth sensing clock signals SS_CLK1 through SS_CLK8 based on the sensing-on clock signal SS_ON_CLK and the sensing-off clock signal SS_OFF_CLK in response to the mode signal SMODE indicating the operation mode other than the multi-clock mode. For example, in the multi-clock mode, the sensing pulse generator block 364 may generate the first sensing clock signal SS_CLK1 that has a rising edge in response to each pulse of the sensing-on clock signal SS_ON_CLK and has a falling edge in response to each pulse of the sensing-off clock signal SS_OFF_CLK during the first on period of the multi sense enable signal MULTI_SEN_EN, and may generate the second sensing clock signal SS_CLK2 that has a rising edge in response to each pulse of the sensing-on clock signal SS_ON_CLK and has a falling edge in response to each pulse of the sensing-off clock signal SS_OFF_CLK during the second on period of the multi sense enable signal MULTI_SEN_EN.

As described above, the gate clock generator 300 according to an embodiment may have or support the multi-clock mode. In the multi-clock mode, the carry clock generator 320 may generate the multi sense enable signal MULTI_SEN_EN, the scan clock generator 340 may output a corresponding scan clock signal having any number of pulses in each on period of the multi sense enable signal MULTI_SEN_EN, and the sensing clock generator 360 may output a corresponding sensing clock signal having any number of pulses in each on period of the multi sense enable signal MULTI_SEN_EN. Accordingly, the display device including the gate clock generator 300 according to an embodiment can perform a number of sensing operations on each pixel within one frame period.

Figure 9:
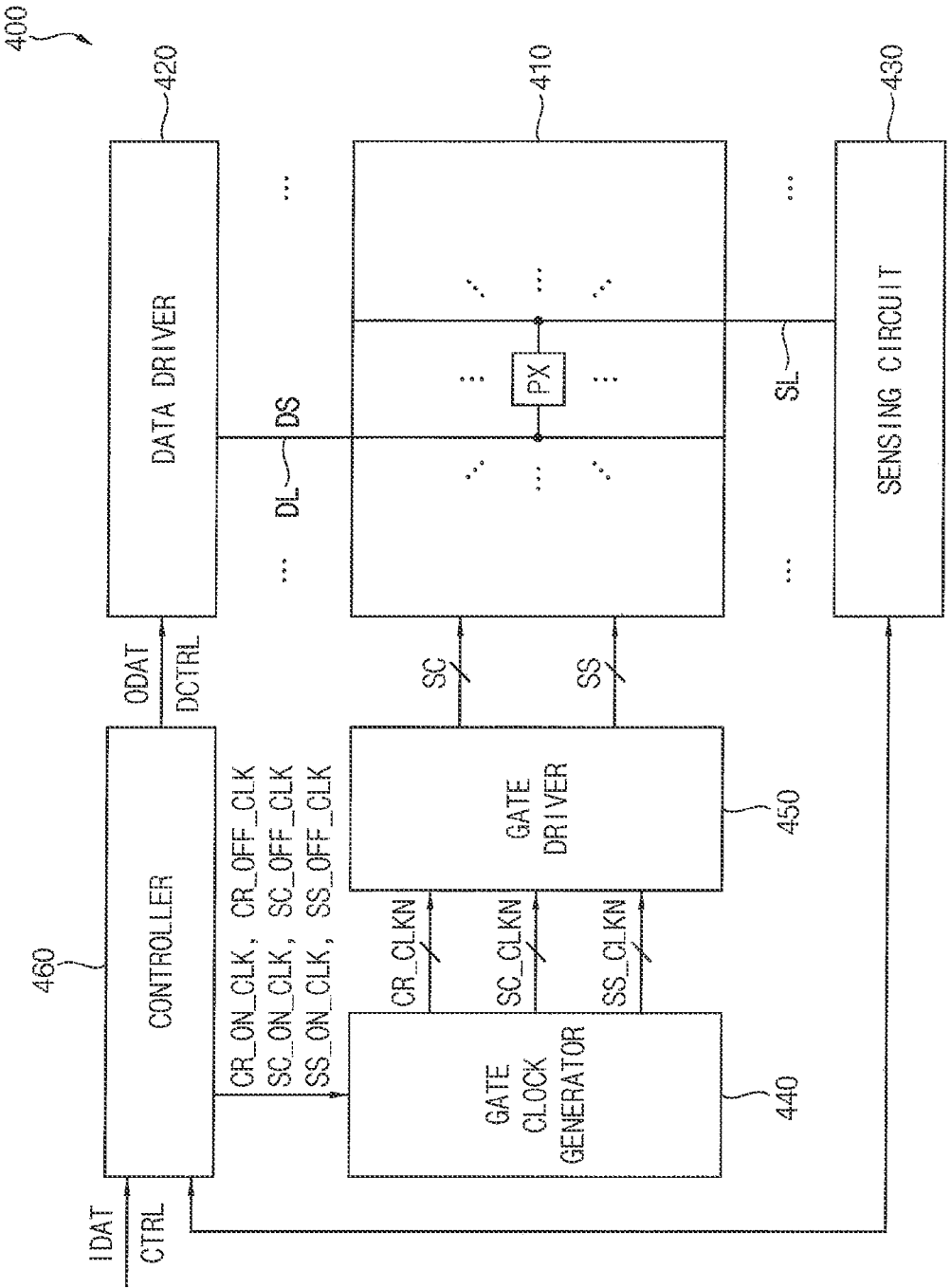
FIG. 9 is a block diagram illustrating a display device according to an embodiment.
Figure 10:
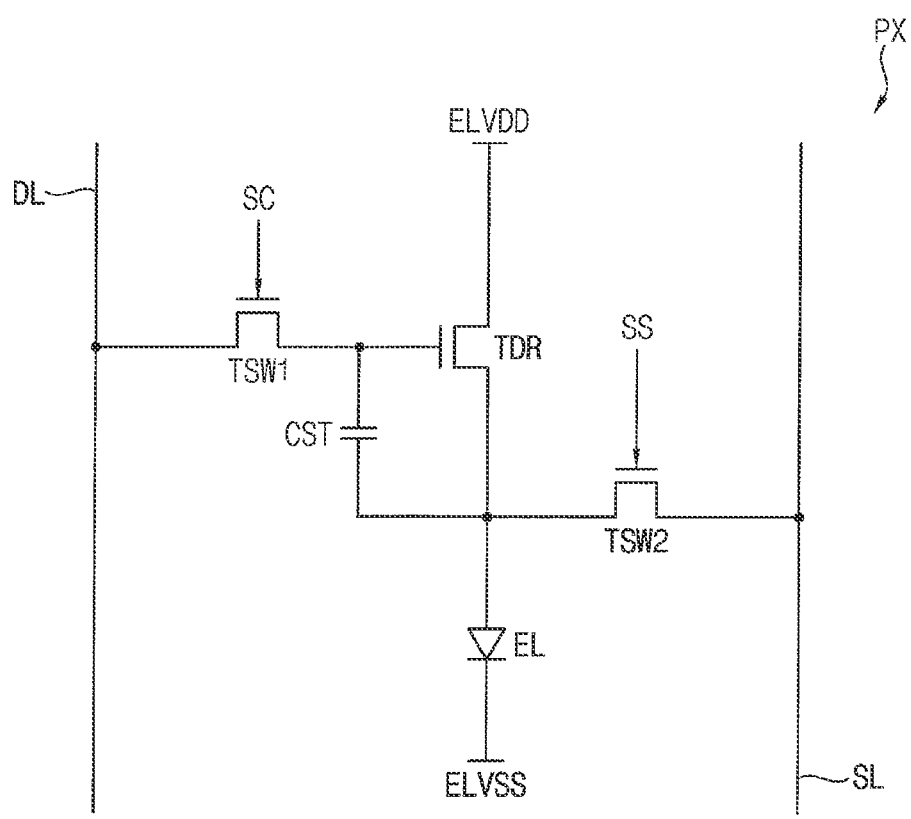
FIG. 10 is a circuit diagram illustrating an example of a pixel included in a display device according to an embodiment.

FIG. 9 is a block diagram illustrating a display device according to an embodiment, and FIG. 10 is a circuit diagram illustrating an example of a pixel included in a display device according to an embodiment.

Referring to FIG. 9, a display device 400 according to an embodiment may include a display panel 410 including a plurality of pixels PX, a data driver 420 coupled to the plurality of pixels PX through a plurality of data lines DL, a sensing circuit 430 coupled to the plurality of pixels PX through a plurality of sensing lines SL, a gate clock generator 440 generating N carry clock signals CR_CLKN, N scan clock signals SC_CLKN and N sensing clock signals SS_CLKN, a gate driver 450 providing a plurality of scan signals SC and a plurality of sensing signals SS to the plurality of pixels PX, and a controller 460 controlling the data driver 420, the sensing circuit 430, the gate clock generator 440 and the gate driver 450.

The display panel 410 may include the plurality of data lines DL, the plurality of sensing lines SL, and the plurality of pixels PX coupled to the plurality of data lines DL and the plurality of sensing lines SL. The display panel 410 may further include a plurality of scan signal lines for transferring the plurality of scan signals SC, and a plurality of sensing signal lines for transferring the plurality of sensing signals SS. In an embodiment, the display panel 410 may be an organic light emitting diode (OLED) display panel where each pixel PX includes at least two transistors, at least one capacitor and an OLED.

For example, as illustrated in FIG. 10, each pixel PX may include a driving transistor TDR, a first switching transistor TSW1, a second switching transistor TSW2, a storage capacitor CST and an organic light emitting diode EL.

The storage capacitor CST may store the data signal DS transferred through the data line DL. In an embodiment, the storage capacitor CST may include a first electrode coupled to a gate of the driving transistor TDR, and a second electrode coupled to a source of the driving transistor TDR.

The first switching transistor TSW1 may couple the data line DL to the first electrode of the storage capacitor CST in response to the scan signal SC. Thus, the first switching transistor TSW1 may transfer the data signal DS of the data line DL to the first electrode of the storage capacitor CST in response to the scan signal SC. In an embodiment, the first switching transistor TSW1 may include a gate receiving the scan signal SC, a drain coupled to the data line DL, and a source coupled to the first electrode of the storage capacitor CST and the gate of the driving transistor TDR.

The second switching transistor TSW2 may couple the sensing line SL to the second electrode of the storage capacitor CST and a source of the driving transistor TDR in response to the sensing signal SS. In an embodiment, the second switching transistor TSW2 may include a gate receiving the sensing signal SS, a drain coupled to the source of the driving transistor TDR, and a source coupled to the sensing line SL.

The driving transistor TDR may generate a driving current based on the data signal DS stored in the storage capacitor CST. In an embodiment, the driving transistor TDR may include the gate coupled to the first electrode of the storage capacitor CST, a drain receiving a first power supply voltage ELVDD (e.g., a high power supply voltage), and a source coupled to the second electrode of the storage capacitor CST and the drain of the second switching transistor TSW2.

The organic light emitting diode EL may emit light in response to the driving current generated by the driving transistor TDR. In an embodiment, the organic light emitting diode EL may include an anode coupled to the source of the driving transistor TDR, and a cathode receiving a second power supply voltage ELVSS (e.g., a low power supply voltage).

Although FIG. 10 illustrates an example of the pixel PX, the pixel PX of the OLED display device 400 according to an embodiment is not limited to the example of FIG. 10. In other an embodiment, the display panel 410 may be a liquid crystal display (LCD) panel where each pixel PX includes a switching transistor and a liquid crystal capacitor coupled to the switching transistor. However, the display panel 410 may not be limited to the OLED display panel and the LCD panel, and may be any other suitable display panel.

The data driver 420 may generate the data signals DS to the plurality of pixels PX based on output image data ODAT and a data control signal DCTRL received from the controller 460, and may provide the data signals DS to the plurality of pixels PX through the plurality of data lines DL. In an embodiment, the data control signal DCTRL may include, but is not limited to, an output data enable signal, a data clock signal and/or a load signal. In an embodiment, the data driver 420 may be implemented with one or more integrated circuits. In other an embodiment, the data driver 420 and the controller 460 may be implemented with a single integrated circuit, and the single integrated circuit may be referred to as a timing controller embedded data driver (TED).

The sensing circuit 430 may perform a sensing operation on the plurality of pixels PX through the plurality of sensing lines SL. For example, with respect to each pixel PX, the data driver 420 may provide a sensing data voltage as the data signal DS to the pixel PX, the gate driver 450 may provide the scan signal SC and the sensing signal SS to the pixel PX, and the sensing circuit 430 may measure a current or a voltage of the pixel PX generated based on the sensing data voltage through the sensing line SL. In an embodiment, in a multi-clock mode, within one frame period, the scan and sensing signals SC and SS having a plurality of pulses (e.g., tens of pulses or hundreds of pulses) may be provided to each pixel PX, and the sensing circuit 430 may perform the sensing operation a plurality of times (e.g., tens of times or hundreds of times) on the pixel PX. In an embodiment, the sensing circuit 430 may be implemented with an integrated circuit separated from an integrated circuit of the data driver 420. In other an embodiment, the sensing circuit 430 may be included in the data driver 420, or may be included in the controller 460.

The gate clock generator 440 may generate signals/voltages for the gate driver 450 based on a scan control signal received from the controller 460, and the gate driver 450 may sequentially apply the plurality of scan signals SC and the plurality of sensing signals SS to the plurality of pixels PX on a row-by-row basis based on the signals/voltages received from the gate clock generator 440. In an embodiment, the gate clock generator 440 may receive a carry-on clock signal CR_ON_CLK, a carry-off clock signal CR_OFF_CLK, a scan-on clock signal SC_ON_CLK, a scan-off clock signal SC_OFF_CLK, a sensing-on clock signal SS_ON_CLK and a sensing-off clock signal SS_OFF_CLK from the controller 460, may sequentially generate N carry clock signals CR_CLKN based on the carry-on clock signal CR_ON_CLK and the carry-off clock signal CR_OFF_CLK, may sequentially generate N scan clock signals SC_CLKN based on the scan-on clock signal SC_ON_CLK and the scan-off clock signal SC_OFF_CLK, and may sequentially generate N sensing clock signals SS_CLKN based on the sensing-on clock signal SS_ON_CLK and the sensing-off clock signal SS_OFF_CLK. In an embodiment, the gate clock generator 440 may be, but not limited to, included in a power management integrated circuit (PMIC) for supplying power to the display device 400. Further, in an embodiment, the gate driver 450 may be integrated or formed in a peripheral portion of the display panel 410. In other an embodiment, the gate driver 450 may be integrated with one or more integrated circuits.

The controller 460 (e.g., a timing controller (TCON)) may receive input image data IDAT and a control signal CTRL from an external host processor (e.g., an application processor (AP), a graphic processing unit (GPU) or a graphic card). In an embodiment, the control signal CTRL may include, but is not limited to, a vertical synchronization signal, a horizontal synchronization signal, an input data enable signal, a master clock signal, or the like. The controller 460 may generate the output image data ODAT, the data control signal DCTRL and on/off clock signals CR_ON_CLK, CR_OFF_CLK, SC_ON_CLK, SC_OFF_CLK, SS_ON_CLK and SS_OFF_CLK based on the input image data IDAT and the control signal CTRL. The controller 460 may control an operation of the data driver 420 by providing the output image data ODAT and the data control signal DCTRL to the data driver 420, and may control operations of the gate clock generator 440 and the gate driver 450 by providing the on/off clock signals CR_ON_CLK, CR_OFF_CLK, SC_ON_CLK, SC_OFF_CLK, SS_ON_CLK and SS_OFF_CLK to the gate clock generator 440.

In the display device 400 according to an embodiment, in the multi-clock mode, the gate clock generator 440 may output a K-th scan clock signal having pulses of which the number corresponds to the number of the scan-on clock signal SC_ON_CLK among the N scan clock signals SC_CLKN during an on period of a K-th carry clock signal among the N carry clock signals CR_CLKN, and may output a K-th sensing clock signal having pulses of which the number corresponds to the number of the sensing-on clock signal SS_ON_CLK among the N sensing clock signals SS_CLKN during the on period of the K-th carry clock signal. Accordingly, the display device 400 may perform a multiple number of sensing operations on each pixel PX within one frame period. Further, not the N carry clock signals CR_CLKN, the N scan clock signals SC_CLKN and the N sensing clock signals SS_CLKN, but the on/off clock signals CR_ON_CLK, CR_OFF_CLK, SC_ON_CLK, SC_OFF_CLK, SS_ON_CLK and SS_OFF_CLK may be transferred between the controller 460 and the gate clock generator 440, and thus the number of output pins of the controller 460 and the number of input pins of the gate clock generator 440 may be reduced.

Figure 11:
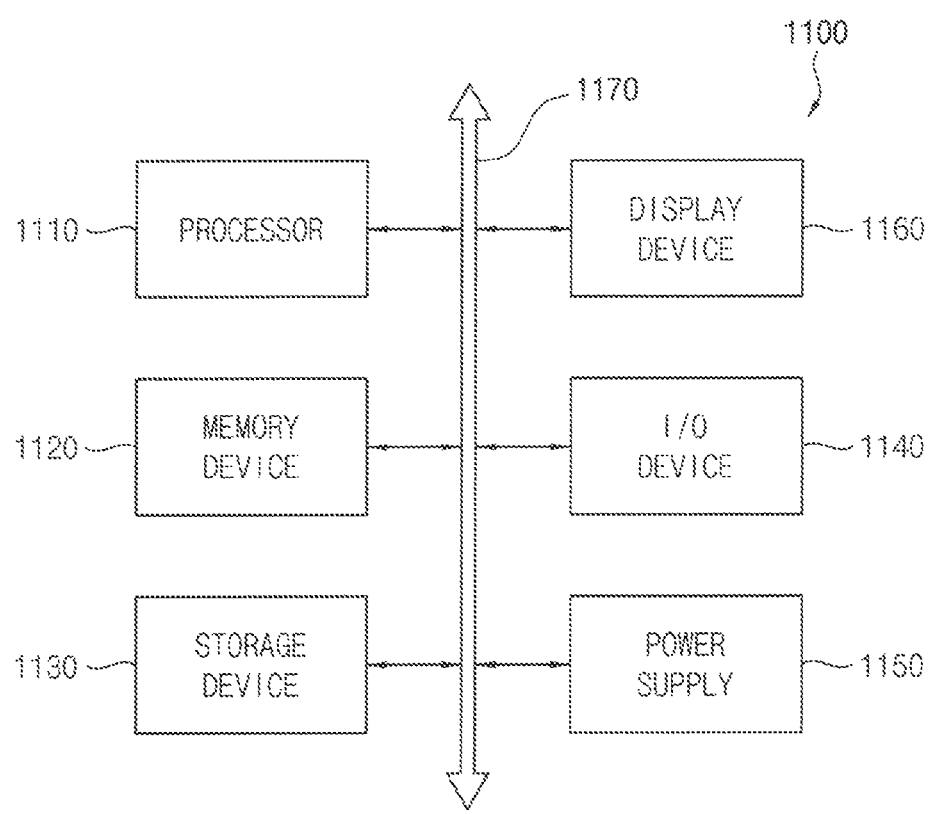
FIG. 11 is a block diagram illustrating an electronic device including a display device according to an embodiment.

FIG. 11 is a block diagram illustrating an electronic device including a display device according to an embodiment.

Referring to FIG. 11, an electronic device 1100 may include a processor 1110, a memory device 1120, a storage device 1130, an input/output (I/O) device 1140, a power supply 1150, a display device 1160, and a communications bus 1170. The electronic device 1100 may further include a plurality of ports for communicating with a video card, a sound card, a memory card, a universal serial bus (USB) device, other electric devices, or the like.

The processor 1110 may perform various computing functions or tasks. The processor 1110 may be an application processor (AP), a microprocessor, a central processing unit (CPU), or the like. The processor 1110 may be coupled to other components via an address bus, a control bus, a data bus, or the like. Further, in an embodiment, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like, and/or at least one volatile memory device such as a dynamic random access memory (DRAM) device, a static random access memory (SRAM) device, a mobile dynamic random access memory (mobile DRAM) device, or the like.

The storage device 1130 may be a solid-state drive (SSD) device, a hard disk drive (HDD) device, a CD-ROM device, or the like. The I/O device 1140 may be an input device such as a keyboard, a keypad, a mouse, a touch screen, or the like, and an output device such as a printer, a speaker, or the like. The power supply 1150 may supply power for operations of the electronic device 1100. The display device 1160 may be coupled to other components through the communications bus 1170, buses and/or other communications links.

In the display device 1160, a carry clock generator may generate N carry clock signals based on a carry-on clock signal and a carry-off clock signal, a scan clock generator may generate N scan clock signals based on a scan-on clock signal and a scan-off clock signal, and a sensing clock generator may generate N sensing clock signals based on a sensing-on clock signal and a sensing-off clock signal. Accordingly, the number of output pins of a controller of the display device 1160 and the number of input pins of the gate clock generator may be reduced compared with a conventional display device in which the carry, scan and sensing clock signals are transferred between the controller and the gate clock generator. Further, in the display device 1160, in a multi-clock mode, the scan clock generator may output a K-th scan clock signal having any number of pulses during an on period of a K-th carry clock signal, and the sensing clock generator may output a K-th sensing clock signal having any number of pulses during the on period of the K-th carry clock signal. Accordingly, the display device 1160 may perform a multiple number of sensing operations on each pixel within one frame period.

The inventive concepts may be applied to any display device 1160, and any electronic device 1100 including the display device 1160. For example, the inventive concepts may be applied to a television (TV), a digital TV, a 3D TV, a smart phone, a wearable electronic device, a tablet computer, a mobile phone, a personal computer (PC), a home appliance, a laptop computer, a personal digital assistant (PDA), a portable multimedia player (PMP), a digital camera, a music player, a portable game console, a navigation device, or the like.

The foregoing is illustrative of embodiments and is not to be construed as limiting thereof. Although embodiments have been described, those skilled in the art will readily appreciate that many modifications are possible without materially departing from the teachings of the present disclosure. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A gate clock generator of a display device, comprising:
    a carry clock generator configured to sequentially generate N carry clock signals based on a carry-on clock signal and a carry-off clock signal, where N is an integer greater than 1;
    a scan clock generator configured to generate N scan clock signals based on a scan-on clock signal and a scan-off clock signal; and
    a sensing clock generator configured to generate N sensing clock signals based on a sensing-on clock signal and a sensing-off clock signal,
    wherein, in a multi-clock mode of the display device, during an on period of a K-th carry clock signal of the N carry clock signals, where K is an integer greater than 0 and less than or equal to N, the scan clock generator outputs a K-th scan clock signal of the N scan clock signals such that the K-th scan clock signal has a number of pulses that corresponds to a number of pulses of the scan-on clock signal in the on period of the K-th carry clock signal, and the sensing clock generator outputs a K-th sensing clock signal of the N sensing clock signals such that the K-th sensing clock signal has a number of pulses that corresponds to a number of pulses of the sensing-on clock signal in the on period of the K-th carry clock signal.

2. The gate clock generator of claim 1, wherein, in the multi-clock mode, the carry clock generator provides the N carry clock signals to the scan clock generator and the sensing clock generator.

3. The gate clock generator of claim 2, wherein, in the multi-clock mode, during the on period of the K-th carry clock signal, the scan clock generator changes the K-th scan clock signal to an on level in response to each pulse of the scan-on clock signal, and changes the K-th scan clock signal to an off level in response to each pulse of the scan-off clock signal, and wherein, in the multi-clock mode, during the on period of the K-th carry clock signal, the sensing clock generator changes the K-th sensing clock signal to the on level in response to each pulse of the sensing-on clock signal, and changes the K-th sensing clock signal to the off level in response to each pulse of the sensing-off clock signal.

4. The gate clock generator of claim 1, wherein the carry clock generator includes:
a carry mode selection block configured to determine an operation mode of the gate clock generator, and to generate a mode signal representing the operation mode;
a carry pulse generator block configured to sequentially generate the N carry clock signals based on the carry-on clock signal and the carry-off clock signal, and to provide the N carry clock signals to the scan clock generator and the sensing clock generator in response to the mode signal indicating the multi-clock mode; and
a carry level shifter block configured to adjust voltage levels of the N carry clock signals to voltage levels suitable for a gate driver, and to provide the N carry clock signals to the gate driver.

5. The gate clock generator of claim 1, wherein the scan clock generator includes:
a scan mode selection block configured to determine an operation mode of the gate clock generator, and to generate a mode signal representing the operation mode;
a scan pulse generator block configured to generate the N scan clock signals based on the N carry clock signals, the scan-on clock signal and the scan-off clock signal in response to the mode signal indicating the multi-clock mode, and to generate the N scan clock signals based on the scan-on clock signal and the scan-off clock signal in response to the mode signal indicating the operation mode other than the multi-clock mode; and
a scan level shifter block configured to adjust voltage levels of the N scan clock signals to voltage levels suitable for a gate driver, and to provide the N scan clock signals to the gate driver.

6. The gate clock generator of claim 1, wherein the sensing clock generator includes:
a sensing mode selection block configured to determine an operation mode of the gate clock generator, and to generate a mode signal representing the operation mode;
a sensing pulse generator block configured to generate the N sensing clock signals based on the N carry clock signals, the sensing-on clock signal and the sensing-off clock signal in response to the mode signal indicating the multi-clock mode, and to generate the N sensing clock signals based on the sensing-on clock signal and the sensing-off clock signal in response to the mode signal indicating the operation mode other than the multi-clock mode; and
a sensing level shifter block configured to adjust voltage levels of the N sensing clock signals to voltage levels suitable for a gate driver, and to provide the N scan clock signals to the gate driver.

7. The gate clock generator of claim 1, wherein, in the multi-clock mode, the carry clock generator provides a multi sensing enable signal to the scan clock generator and the sensing clock generator.

8. The gate clock generator of claim 7, wherein, in the multi-clock mode, during a first on period of the multi sensing enable signal, the scan clock generator changes a first scan clock signal of the N scan clock signals to an on level in response to each pulse of the scan-on clock signal, and changes the first scan clock signal to an off level in response to each pulse of the scan-off clock signal, wherein, in the multi-clock mode, during a second on period of the multi sensing enable signal, the scan clock generator changes a second scan clock signal of the N scan clock signals to the on level in response to each pulse of the scan-on clock signal, and changes the second scan clock signal to the off level in response to each pulse of the scan-off clock signal, wherein, in the multi-clock mode, during the first on period of the multi sensing enable signal, the sensing clock generator changes a first sensing clock signal of the N sensing clock signals to the on level in response to each pulse of the sensing-on clock signal, and changes the first sensing clock signal to the off level in response to each pulse of the sensing-off clock signal, and wherein, in the multi-clock mode, during the second on period of the multi sensing enable signal, the sensing clock generator changes a second sensing clock signal of the N sensing clock signals to the on level in response to each pulse of the sensing-on clock signal, and changes the second sensing clock signal to the off level in response to each pulse of the sensing-off clock signal.

9. The gate clock generator of claim 1, wherein the carry clock generator includes:
a carry mode selection block configured to determine an operation mode of the gate clock generator, and to generate a mode signal representing the operation mode;
a carry pulse generator block configured to sequentially generate the N carry clock signals based on the carry-on clock signal and the carry-off clock signal, and to generate a multi sensing enable signal in response to the mode signal indicating the multi-clock mode, the multi sensing enable signal having an on period when at least one of the N carry clock signals has an on period; and
a carry level shifter block configured to adjust voltage levels of the N carry clock signals to voltage levels suitable for a gate driver, and to provide the N carry clock signals to the gate driver.

10. The gate clock generator of claim 1, wherein the scan clock generator includes:
- a scan mode selection block configured to determine an operation mode of the gate clock generator, and to generate a mode signal representing the operation mode;
- a scan pulse generator block configured to generate the N scan clock signals based on a multi sensing enable signal received from the carry clock generator, the scan-on clock signal and the scan-off clock signal in response to the mode signal indicating the multi-clock mode, and to generate the N scan clock signals based on the scan-on clock signal and the scan-off clock signal in response to the mode signal indicating the operation mode other than the multi-clock mode; and
- a scan level shifter block configured to adjust voltage levels of the N scan clock signals to voltage levels suitable for a gate driver, and to provide the N scan clock signals to the gate driver.

11. The gate clock generator of claim 1, wherein the sensing clock generator includes:
- a sensing mode selection block configured to determine an operation mode of the gate clock generator, and to generate a mode signal representing the operation mode;
- a sensing pulse generator block configured to generate the N sensing clock signals based on a multi sensing enable signal received from the carry clock generator, the sensing-on clock signal and the sensing-off clock signal in response to the mode signal indicating the multi-clock mode, and to generate the N sensing clock signals based on the sensing-on clock signal and the sensing-off clock signal in response to the mode signal indicating the operation mode other than the multi-clock mode; and
- a sensing level shifter block configured to adjust voltage levels of the N sensing clock signals to voltage levels suitable for a gate driver, and to provide the N scan clock signals to the gate driver.

12. A gate clock generator of a display device comprising:
- a carry clock generator configured to receive a carry-on clock signal, a carry-off clock signal from a controller of the display device, and to sequentially generate N carry clock signals based on the carry-on clock signal and the carry-off clock signal, where N is an integer greater than 1;
- a scan clock generator configured to receive a multi sensing enable signal, a scan-on clock signal and a scan-off clock signal from the controller, to generate N scan clock signals based on the multi sensing enable signal, the scan-on clock signal and the scan-off clock signal in a multi-clock mode of the display device, and to generate the N scan clock signals based on the scan-on clock signal and the scan-off clock signal in an operation mode other than the multi-clock mode; and
- a sensing clock generator configured to receive the multi sensing enable signal, a sensing-on clock signal and a sensing-off clock signal from the controller, to generate N sensing clock signals based on the multi sensing enable signal, the sensing-on clock signal and the sensing-off clock signal in the multi-clock mode, and to generate the N sensing clock signals based on the sensing-on clock signal and the sensing-off clock signal in the operation mode other than the multi-clock mode.

13. The gate clock generator of claim 12, wherein, in the multi-clock mode, during a first on period of the multi sensing enable signal, the scan clock generator changes a first scan clock signal of the N scan clock signals to an on level in response to each pulse of the scan-on clock signal, and changes the first scan clock signal to an off level in response to each pulse of the scan-off clock signal,
wherein, in the multi-clock mode, during a second on period of the multi sensing enable signal, the scan clock generator changes a second scan clock signal of the N scan clock signals to the on level in response to each pulse of the scan-on clock signal, and changes the second scan clock signal to the off level in response to each pulse of the scan-off clock signal,
wherein, in the multi-clock mode, during the first on period of the multi sensing enable signal, the sensing clock generator changes a first sensing clock signal of the N sensing clock signals to the on level in response to each pulse of the sensing-on clock signal, and changes the first sensing clock signal to the off level in response to each pulse of the sensing-off clock signal, and
wherein, in the multi-clock mode, during the second on period of the multi sensing enable signal, the sensing clock generator changes a second sensing clock signal of the N sensing clock signals to the on level in response to each pulse of the sensing-on clock signal, and changes the second sensing clock signal to the off level in response to each pulse of the sensing-off clock signal.

14. The gate clock generator of claim 12, wherein the scan clock generator includes:
- a scan mode selection block configured to determine the operation mode of the gate clock generator, and to generate a mode signal representing the operation mode;
- a scan pulse generator block configured to generate the N scan clock signals based on the multi sensing enable signal received from the controller, the scan-on clock signal and the scan-off clock signal in response to the mode signal indicating the multi-clock mode, and to generate the N scan clock signals based on the scan-on clock signal and the scan-off clock signal in response to the mode signal indicating the operation mode other than the multi-clock mode; and
- a scan level shifter block configured to adjust voltage levels of the N scan clock signals to voltage levels suitable for a gate driver, and to provide the N scan clock signals to the gate driver.

15. The gate clock generator of claim 12, wherein the sensing clock generator includes:
- a sensing mode selection block configured to determine the operation mode of the gate clock generator, and to generate a mode signal representing the operation mode;
- a sensing pulse generator block configured to generate the N sensing clock signals based on the multi sensing enable signal received from the controller, the sensing-on clock signal and the sensing-off clock signal in response to the mode signal indicating the multi-clock mode, and to generate the N sensing clock signals based on the sensing-on clock signal and the sensing-off clock signal in response to the mode signal indicating the operation mode other than the multi-clock mode; and
- a sensing level shifter block configured to adjust voltage levels of the N sensing clock signals to voltage levels suitable for a gate driver, and to provide the N scan clock signals to the gate driver.

16. A display device comprising:
a display panel including a plurality of pixels;
a data driver coupled to the plurality of pixels through a plurality of data lines;
a sensing circuit coupled to the plurality of pixels through a plurality of sensing lines;
a controller configured to control the data driver and the sensing circuit, and to generate a carry-on clock signal, a carry-off clock signal, a scan-on clock signal, a scan-off clock signal, a sensing-on clock signal and a sensing-off clock signal;
a gate clock generator configured to sequentially generate N carry clock signals based on the carry-on clock signal and the carry-off clock signal, to generate N scan clock signals based on the scan-on clock signal and the scan-off clock signal, and to generate N sensing clock signals based on the sensing-on clock signal and the sensing-off clock signal, where N is an integer greater than 1; and
a gate driver configured to provide a plurality of scan signals and a plurality of sensing signals to the plurality of pixels based on the N carry clock signals, the N scan clock signals and the N sensing clock signals,
wherein, in a multi-clock mode of the display device, during an on period of a K-th carry clock signal of the N carry clock signals, where K is an integer greater than 0 and less than or equal to N, the scan clock generator outputs a K-th scan clock signal of the N scan clock signals such that the K-th scan clock signal has a number of pulses that corresponds to a number of pulses of the scan-on clock signal in the on period of the K-th carry clock signal, and the sensing clock generator outputs a K-th sensing clock signal of the N sensing clock signals such that the K-th sensing clock signal has a number of pulses that corresponds to a number of pulses of the sensing-on clock signal in the on period of the K-th carry clock signal.

17. The display device of claim 16, wherein the gate clock generator includes:
a carry clock generator configured to sequentially generate the N carry clock signals based on the carry-on clock signal and the carry-off clock signal;
a scan clock generator configured to generate the N scan clock signals based on the scan-on clock signal and the scan-off clock signal; and
a sensing clock generator configured to generate the N sensing clock signals based on the sensing-on clock signal and the sensing-off clock signal.

18. The display device of claim 17, wherein, in the multi-clock mode, the carry clock generator provides the N carry clock signals to the scan clock generator and the sensing clock generator.

19. The display device of claim 17, wherein, in the multi-clock mode, the carry clock generator provides a multi sensing enable signal to the scan clock generator and the sensing clock generator.

20. The display device of claim 17, wherein, in the multi-clock mode, the controller provides a multi sensing enable signal to the scan clock generator and the sensing clock generator.

* * * * *